US012697548B2

(12) United States Patent
Sano et al.

(10) Patent No.: US 12,697,548 B2
(45) Date of Patent: Aug. 4, 2026

(54) STORAGE MEDIUM, GAME SYSTEM AND GAME CONTROL METHOD

(71) Applicant: NINTENDO CO., LTD., Kyoto (JP)

(72) Inventors: Shinya Sano, Kyoto (JP); Kodai Matsumoto, Kyoto (JP); Takaki Abe, Osaka (JP)

(73) Assignee: NINTENDO CO., LTD., Kyoto (JP)

( * ) Notice: Subject to any disclaimer, the term of this patent is extended or adjusted under 35 U.S.C. 154(b) by 346 days.

(21) Appl. No.: 18/361,392

(22) Filed: Jul. 28, 2023

(65) Prior Publication Data

US 2024/0033634 A1     Feb. 1, 2024

(30) Foreign Application Priority Data

Jul. 29, 2022    (JP) ................................. 2022-122149

(51) Int. Cl.
*A63F 13/56* (2014.01)
*A63F 13/525* (2014.01)
*A63F 13/537* (2014.01)

(52) U.S. Cl.
CPC ............ *A63F 13/56* (2014.09); *A63F 13/525* (2014.09); *A63F 13/537* (2014.09)

(58) Field of Classification Search
CPC ...... A63F 13/55; A63F 13/56; A63F 13/5255; A63F 13/525; A63F 13/537
See application file for complete search history.

(56) References Cited

U.S. PATENT DOCUMENTS 9,007,379 B1 *  4/2015  Shafer ..................... G06T 11/40
                                                  345/473
10,610,782 B2   4/2020  Motokura et al.
                        (Continued)

FOREIGN PATENT DOCUMENTS

JP      2008067875 A    3/2008
JP      2019037614 A    3/2019

OTHER PUBLICATIONS

Abyx Gaming, "How to SWITCH to 3rd person POV in Ghost Recon Breakpoint", Oct. 2, 2019, Youtube.com, pp. 1-9, at https://www.youtube.com/watch?v=zmSvg_5ulJw (last visited Oct. 21, 2025). (Year: 2019).*

*Primary Examiner* — Steve Rowland
(74) *Attorney, Agent, or Firm* — Scully, Scott, Murphy & Presser, P.C.

(57) ABSTRACT

A non-limiting example game system includes a main body apparatus that executes a virtual game, and a game screen is displayed on a display. In the game screen, a player character and background objects such as a floor, stairs and a door are displayed. In a normal mode during play of a normal game, if a change to a shooting mode is selected, a virtual camera is arranged in a position and a direction that are set based on a position and a direction of a virtual camera in the normal mode. Moreover, if a change to a menu mode from the normal mode is selected, the virtual camera is arranged based on a position and a direction of the player character to view a virtual space over a shoulder of the player character. If the shooting mode is selected in the menu mode, the virtual camera is arranged in a position and a direction that are set based on a position and a direction of the virtual camera in the menu mode.

21 Claims, 29 Drawing Sheets

GAME SCREEN (MENU MODE)  200  220  222  224

202

(56)          References Cited

U.S. PATENT DOCUMENTS

| | | | | |
|---|---|---|---|---|
| 2007/0270215 A1* | 11/2007 | Miyamoto | .............. | A63F 13/45 |
| | | | | 463/32 |
| 2008/0143722 A1* | 6/2008 | Pagan | .................... | A63F 13/10 |
| | | | | 345/427 |
| 2011/0244956 A1* | 10/2011 | Sakakibara | .......... | A63F 13/213 |
| | | | | 463/31 |
| 2017/0301135 A1* | 10/2017 | Jagnow | ................ | G06T 19/003 |
| 2018/0144547 A1* | 5/2018 | Shakib | .................. | G06T 15/503 |
| 2018/0160049 A1* | 6/2018 | Aizawa | .................. | H04N 23/69 |
| 2019/0080495 A1* | 3/2019 | Andronikos | ........... | G06T 11/60 |
| 2019/0325650 A1* | 10/2019 | Milz | ...................... | H04N 23/54 |
| 2020/0293176 A1* | 9/2020 | Yoganandan | ....... | G06F 3/04815 |
| 2020/0322590 A1* | 10/2020 | Fattal | .................. | H04N 13/349 |
| 2020/0357163 A1* | 11/2020 | Wang | .................. | G06F 3/04815 |
| 2021/0117070 A1* | 4/2021 | Muta | .................... | A63F 13/422 |
| 2022/0109794 A1* | 4/2022 | Takahashi | ........... | H04N 23/695 |
| 2022/0261953 A1* | 8/2022 | Li | ........................ | H04N 23/698 |

* cited by examiner

GAME SCREEN (NORMAL MODE)   200

GAME SCREEN (SHOOTING MODE) 200

GAME SCREEN (MENU MODE)    200     220     222

GAME SCREEN (MENU MODE)    200   220    222     224

NORMAL MODE (SIDE)

NORMAL MODE (REAR)

SHOOTING MODE (SIDE)

SHOOTING MODE (REAR)

MENU MODE (SIDE)

MENU MODE (REAR)

CHANGE TO SHOOTING MODE FROM NORMAL MODE

CHANGE TO MENU MODE FROM NORMAL MODE

WORLD COORDINATES
SYSTEM

FIG. 17
CHANGE TO SHOOTING MODE FROM MENU MODE
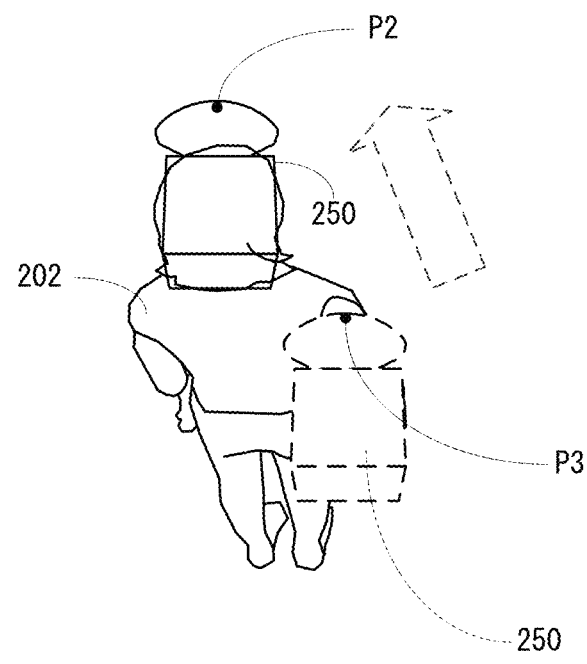
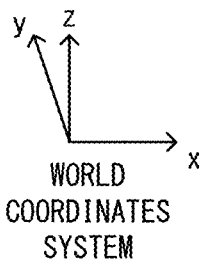
WORLD
COORDINATES
SYSTEM

GAME SCREEN (NORMAL MODE)

CHANGE TO MENU MODE FROM NORMAL MODE

GAME SCREEN (SHOOTING MODE) 200

GAME SCREEN (NORMAL MODE) 200

FIG. 22

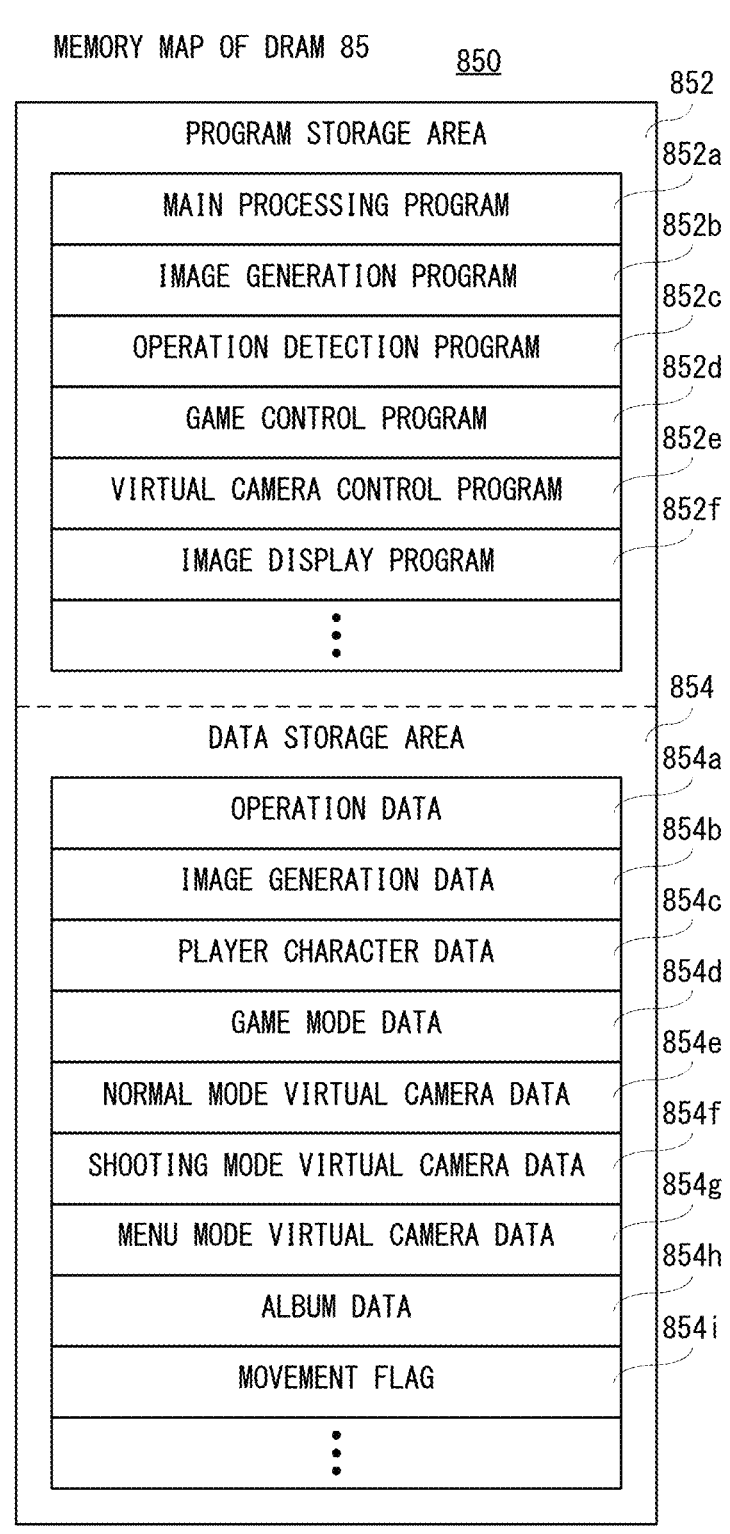

MEMORY MAP OF DRAM 85          850          852

PROGRAM STORAGE AREA          852a

MAIN PROCESSING PROGRAM          852b

IMAGE GENERATION PROGRAM          852c

OPERATION DETECTION PROGRAM          852d

GAME CONTROL PROGRAM          852e

VIRTUAL CAMERA CONTROL PROGRAM          852f

IMAGE DISPLAY PROGRAM

⋮

854

DATA STORAGE AREA          854a

OPERATION DATA          854b

IMAGE GENERATION DATA          854c

PLAYER CHARACTER DATA          854d

GAME MODE DATA          854e

NORMAL MODE VIRTUAL CAMERA DATA          854f

SHOOTING MODE VIRTUAL CAMERA DATA          854g

MENU MODE VIRTUAL CAMERA DATA          854h

ALBUM DATA          854i

MOVEMENT FLAG

⋮

CHANGE TO SHOOTING MODE FROM NORMAL MODE

WORLD COORDINATES
SYSTEM

FIG. 32
CHANGE TO SHOOTING MODE FROM MENU MODE
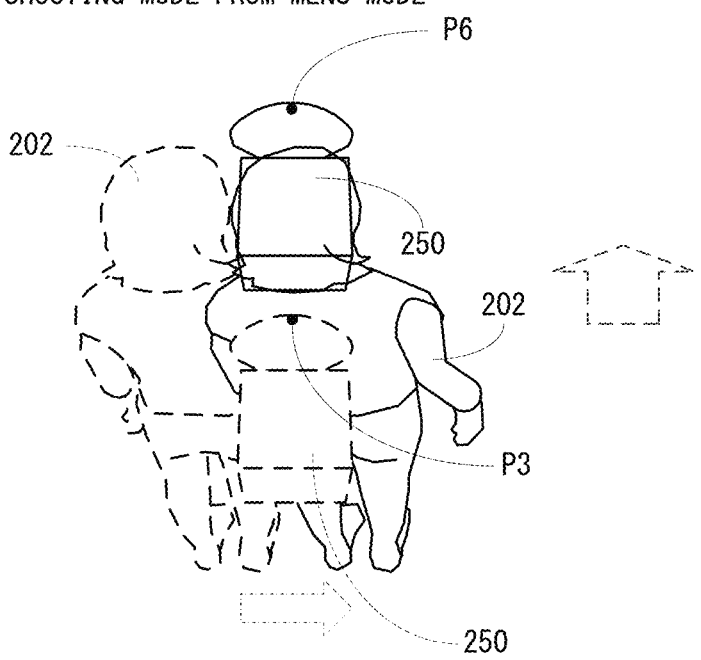
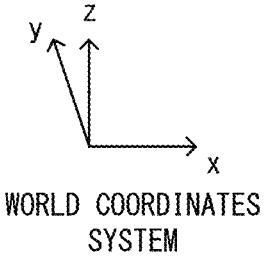
WORLD COORDINATES
SYSTEM

STORAGE MEDIUM, GAME SYSTEM AND GAME CONTROL METHOD

CROSS REFERENCE OF RELATED APPLICATION

This application claims a priority to Japanese Patent Application No. 2022-122149 filed on Jul. 29, 2022, and the entire contents of which are incorporated herein by reference.

FIELD

This application describes a storage medium, a game system and a game control method, in which a player moves a player character in a virtual space to advance a virtual game.

SUMMARY

It is a primary object of an embodiment(s) to provide a novel storage medium, game system and game control method.

Moreover, it is another object of the embodiment(s) to provide a storage medium, game system and game control method, capable of starting a shooting mode by selecting one of a plurality of starting methods with different positions and different directions of a virtual camera at the time of starting to shoot an image.

A first embodiment is a non-transitory computer-readable storage medium having stored with a game program executable by one or more processors of an information processing apparatus, wherein the game program causes the one or more processors to execute: executing a game played by a player in any one game mode out of a normal mode, a menu mode and a shooting mode; and generating an image of a virtual space based on a virtual camera; and in the normal mode, moving a player character in the virtual space based on a moving operation input in the normal mode; controlling the virtual camera in the virtual space based on a first virtual camera operation input; changing from the normal mode to the menu mode based on a first operation input; and changing from the normal mode to the shooting mode based on a second operation input; and in the menu mode, arranging, when changing to the menu mode based on the first operation input, the virtual camera in a predetermined position based on a position of the player character regardless of an arrangement of the virtual camera before changing to the menu mode; generating a menu image that includes a plurality of selectable menu items; and changing from the menu mode to the shooting mode based on a third operation input; and in the shooting mode, arranging, when changed to the shooting mode, the virtual camera at a start time of the shooting mode in a position based on an arrangement of the virtual camera before changing to the shooting mode; controlling a position and a direction of the virtual camera based on a second virtual camera operation input; and storing an image based on the virtual camera according to a shooting instruction input in a memory.

According to the first embodiment, since the position and the direction of the virtual camera differ on whether the shooting mode is changed after changing from the normal mode to the menu mode or the shooting mode is changed from the normal mode, it is possible to start the shooting mode by selecting one of a plurality of starting methods with different positions and different directions of the virtual camera at the time of starting to shoot an image.

A second embodiment is the storage medium according to the first embodiment, wherein the game program causes the one or more processors to execute: generating the menu image including a shooting mode changing menu item for changing to the shooting mode based on the third operation input.

A third embodiment is the storage medium according to the first embodiment, wherein the game program causes the one or more processors to execute: generating an image of the virtual space based on the virtual camera; and generating the menu image including a plurality of translucent menu items.

According to the third embodiment, since a background behind the menu items can be confirmed because the menu items are translucent, it is possible to determine whether to perform shooting an image even while looking at the menu items.

A fourth embodiment is the storage medium according to the first embodiment, wherein the game program causes the one or more processors to execute: setting the position and the direction of the virtual camera so as to become a position and a direction capable of shooting the player character from a back side of the player character.

According to the fourth embodiment, it is possible to perform shooting with the perspective of the player character by changing to the menu mode and wrapping the virtual camera around behind the player character.

A fifth embodiment is the storage medium according to the first embodiment, wherein the game program causes the one or more processors to execute: generating in the normal mode and the menu mode, based on the virtual camera, an image of the virtual space including the player character; and generating in the shooting mode, based on the virtual camera, an image not including the player character.

According to the fifth embodiment, since an image including the player character or an image not including the player character is generated according to a game mode, it is possible to generate an image corresponding to a situation.

A sixth embodiment is the storage medium according to the first embodiment, wherein the game program causes the one or more processors to execute: controlling a position and a direction of the player character based on the second virtual camera operation input.

According to the sixth embodiment, in the shooting mode, since the position and the direction of the player character may be controlled as well as the position and the direction of the virtual camera, a position of a desired object having been found in the shooting mode is not lost. Moreover, it is possible to naturally express that the player character is using the camera object in the virtual space and is moving together with the camera object.

A seventh embodiment is the storage medium according to the first embodiment, wherein the game program causes the one or more processors to execute: changing from the shooting mode to a mode before changing to the shooting mode based on a fourth operation input, and setting the direction of the virtual camera to a direction of the virtual camera before changing to the shooting mode when changed from the shooting mode to the normal mode or the menu mode based on the fourth operation input.

An eighth embodiment is the storage medium according to the first embodiment, wherein the game program causes the one or more processors to execute: changing from the menu mode to the normal mode based on a fourth operation input after changing to the menu mode based on the first operation input; and setting the direction of the virtual camera to a direction of the virtual camera in the normal mode before changing to the menu mode when changed from the menu mode to the normal mode based on the fourth operation input.

A ninth embodiment is the storage medium according to the first embodiment, wherein the game program causes the one or more processors to execute: storing a predetermined part of a generated image of the virtual space in the memory as the image based on the virtual camera.

A tenth embodiment is the storage medium according to the first embodiment, wherein the game program causes the one or more processors to execute: moving, when changed to the shooting mode, the position of the virtual camera by a predetermined distance in a predetermined direction based on the direction of the virtual camera before changing to the shooting mode.

An eleventh embodiment is a game system comprising one or more processors, configured to execute game processing. In the game processing, the one or more processors is configured to execute a game played by a player in any one game mode out of a normal mode, a menu mode and a shooting mode and generate an image of a virtual space based on a virtual camera. The one or more processors is configured to, in the normal mode: move a player character in the virtual space based on a moving operation input; control the virtual camera in the virtual space based on a first virtual camera operation input; change from the normal mode to the menu mode based on a first operation input; and change from the normal mode to the shooting mode based on a second operation input. The one or more processors is configured to, in the menu mode: arrange, when changing to the menu mode, the virtual camera at a predetermined position that is based on a position of a player character regardless of an arrangement of the virtual camera before changing to the menu mode; generate a menu image including a plurality of selectable menu items; and change from the menu mode to the shooting mode. The one or more processors is configured to, in the shooting mode: arrange, when changing to the shooting mode, the virtual camera at a start of the shooting mode at a position that is based on an arrangement of the virtual camera before changing to the shooting mode; control a position and a direction of the virtual camera based on a second virtual camera operation input; and store an image that is based on the virtual camera in a memory based on a shooting instruction in a memory.

A twelfth embodiment is a game control method of a game apparatus. The game control method comprises executing a game played by a player in any one game mode out of a normal mode, a menu mode and a shooting mode and generating an image of a virtual space based on a virtual camera. The game control method comprises, in the normal mode: moving a player character in the virtual space based on a moving operation input; controlling the virtual camera in the virtual space based on a first virtual camera operation input; changing from the normal mode to the menu mode based on a first operation input; and changing from the normal mode to the shooting mode based on a second operation input. The game control method comprises, in the menu mode: arranging, when changing to the menu mode, the virtual camera at a predetermined position that is based on a position of a player character regardless of an arrangement of the virtual camera before changing to the menu mode; generating a menu image including a plurality of selectable menu items; and changing from the menu mode to the shooting mode. The game control method comprises, in the shooting mode: arranging, when changing to the shooting mode, the virtual camera at a start of the shooting mode at a position that is based on an arrangement of the virtual camera before changing to the shooting mode; controlling a position and a direction of the virtual camera based on a second virtual camera operation input; and storing an image that is based on the virtual camera in a memory based on a shooting instruction in a memory.

In also the eleventh embodiment and the twelfth embodiment, similar to the first embodiment, it is possible to start the shooting mode by selecting one of a plurality of starting methods with different positions and different directions of the virtual camera at the time of starting to shoot an image.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 17 is a view showing a non-limiting example positional relationship between the player character and the virtual camera when changing from the menu mode to the shooting mode viewed diagonally above the virtual space.

FIG. 22 is a view showing a non-limiting example memory map of a DRAM of the main body apparatus shown in FIG. 6.

FIG. 32 is a view showing another non-limiting example positional relationship between the player character and the virtual camera when changing from the menu mode to the shooting mode viewed diagonally above the virtual space.

DETAILED DESCRIPTION OF NON-LIMITING
EXAMPLE EMBODIMENTS

A non-limiting example game system according to an exemplary embodiment will be described in the following.

The non-limiting example game system 1 according to the embodiment comprises a main body apparatus (an information processing apparatus that functions as a game apparatus main body in the embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to the embodiment will be described, and then, the control of the game system 1 of the embodiment will be described.

Figure 1:
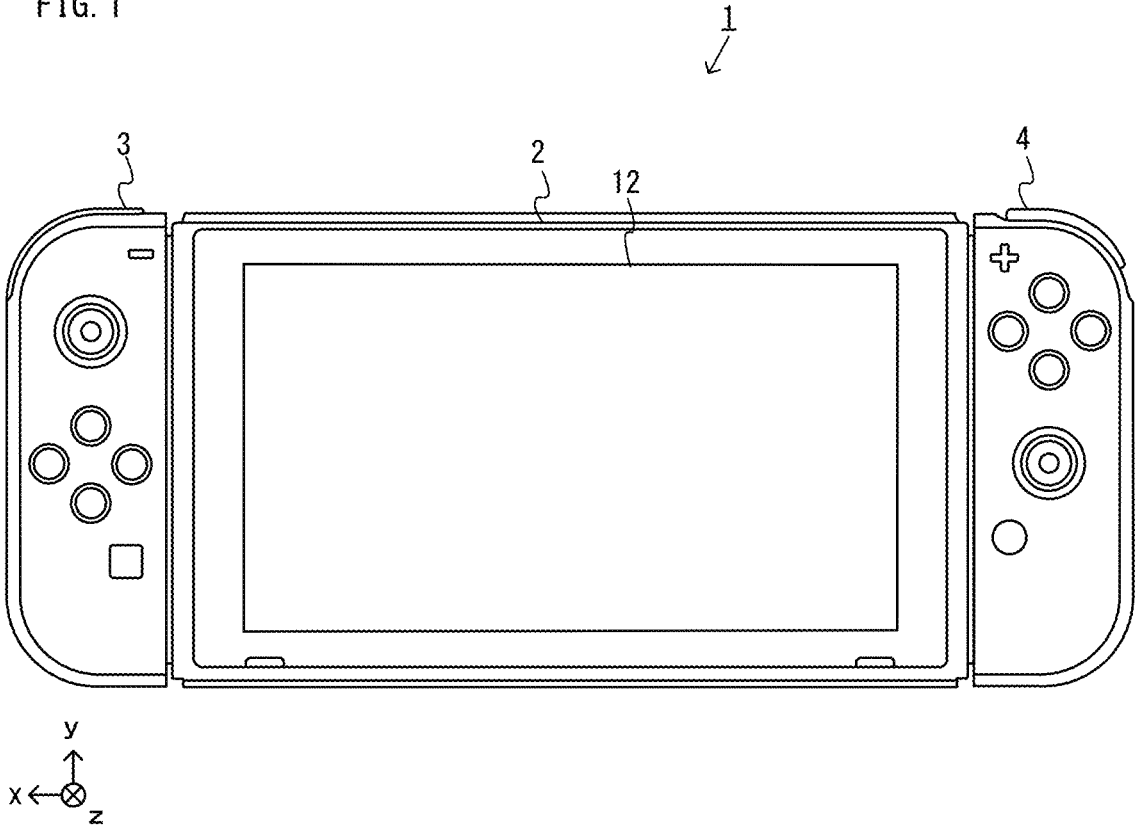
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
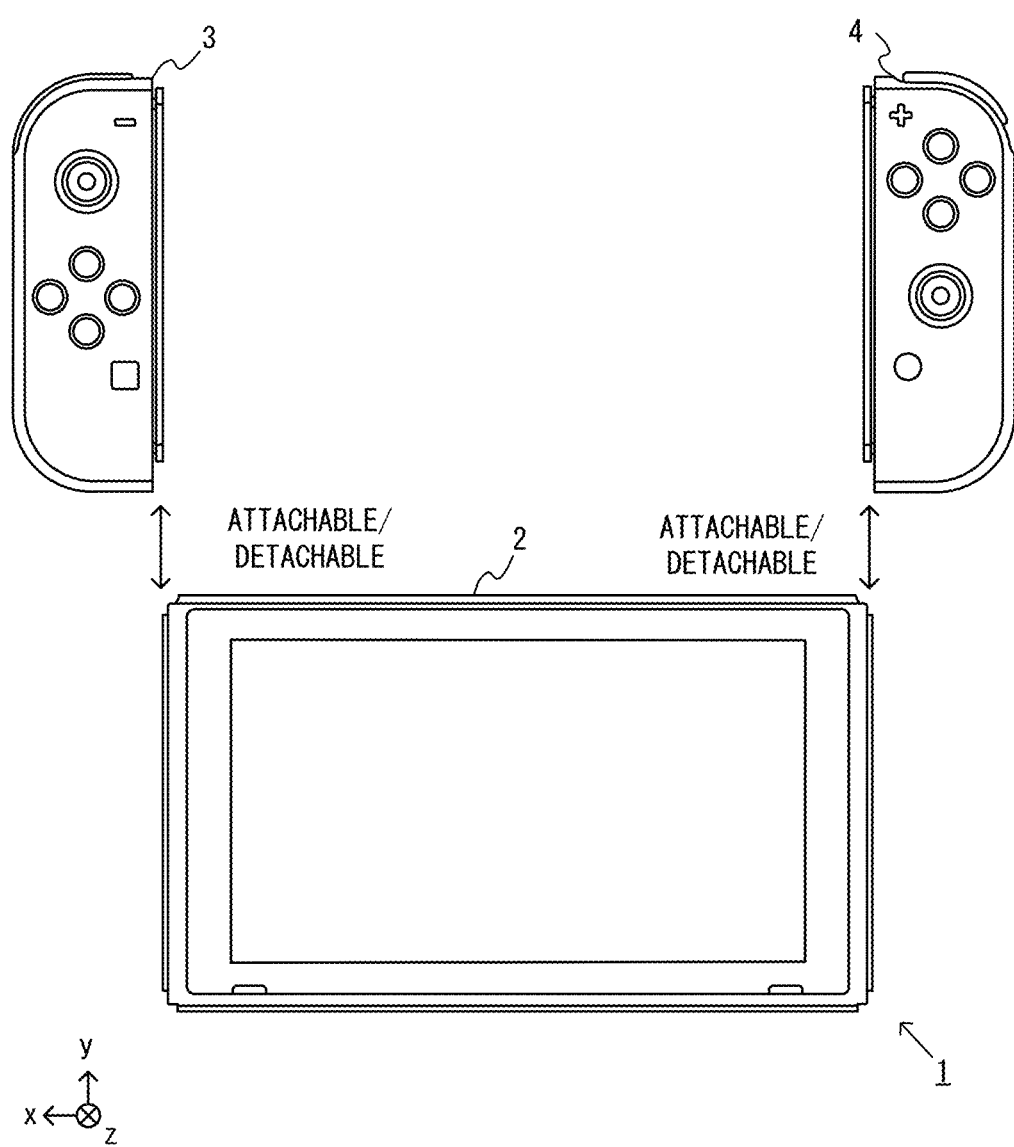
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a "controller" in the following.

Figure 3:
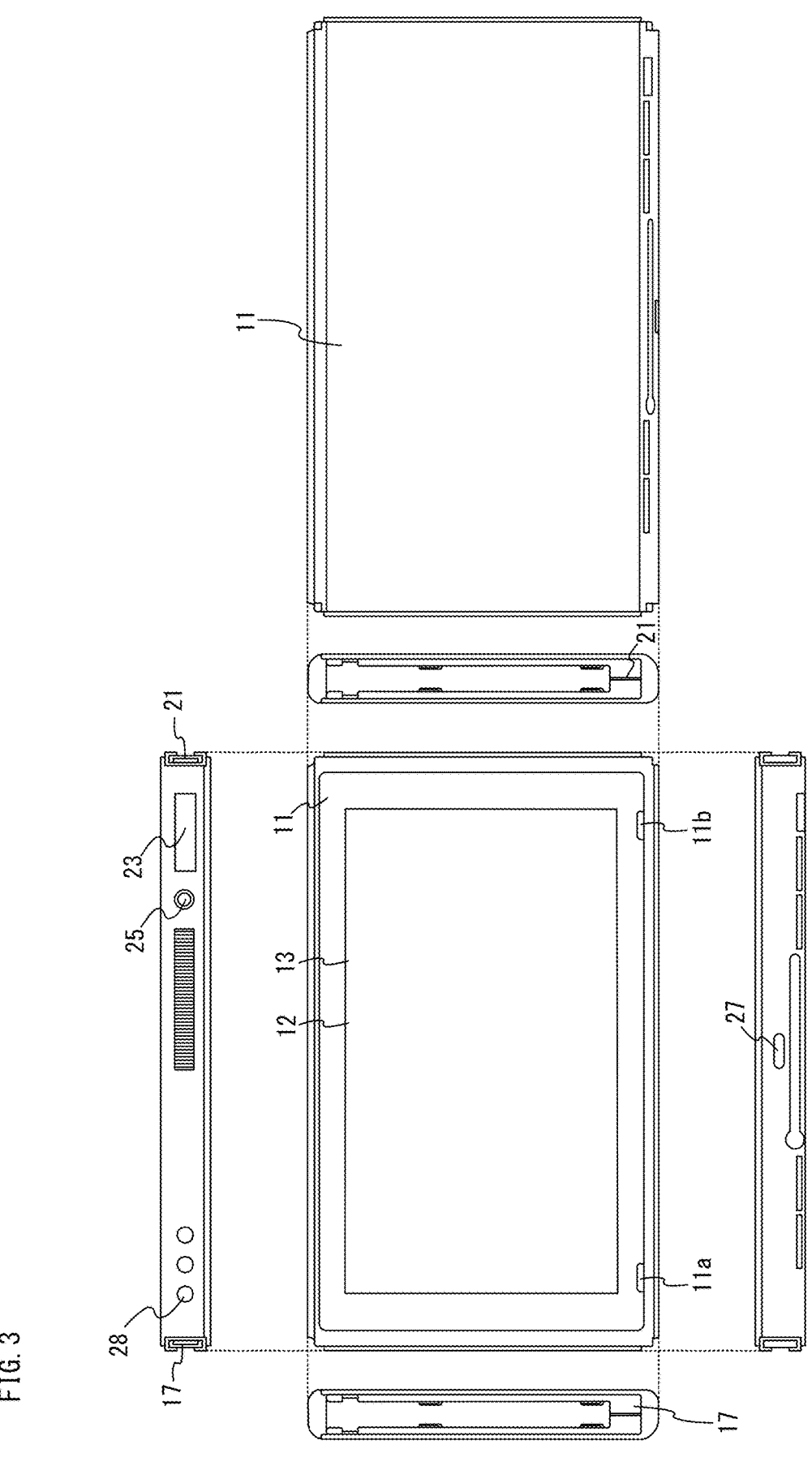
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In the embodiment, a main surface (in other words, a surface on a front side, that is, a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In the embodiment, the display 12 is a liquid crystal display device (LCD). However, the display 12 may be an arbitrary type display.

Moreover, the main body apparatus 2 comprises a touch panel 13 on a screen of the display 12. In the embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11*a* and 11*b* are formed on the main surface of the housing 11. Then, sounds output from the speakers 88 are emitted through the speaker holes 11*a* and 11*b*.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 or an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In the embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in the embodiment, the cradle has the function of charging the unified apparatus or the main body apparatus 2 alone that is put on the cradle. Moreover, the cradle has a function of a hub device (specifically, a USB hub).

Figure 4:
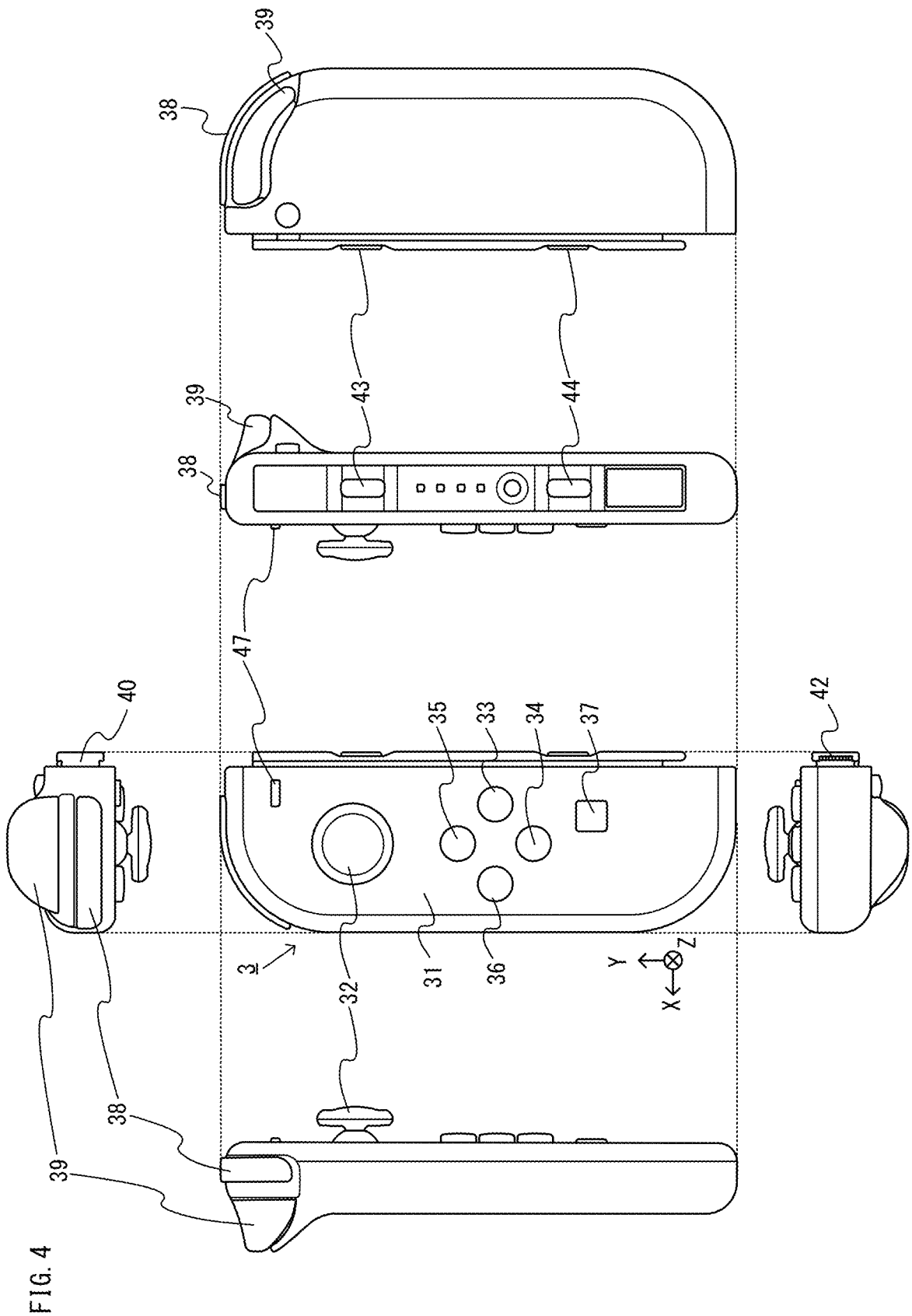
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In the embodiment, the housing 31 has a vertically long shape, that is, is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in the embodiment, it is possible to provide an input by pressing the analog stick 32. The left controller 3 comprises various operation buttons. The left controller 3 comprises four (4) operation buttons 33-36 (specifically, a right direction button 33, a down direction button 34, an up direction button and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e.g., an OS program and an application program) executed by the main body apparatus 2.

Moreover, the left controller 3 comprises a terminal 42 for the left controller 3 to perform wired communication with the main body apparatus 2.

Figure 5:
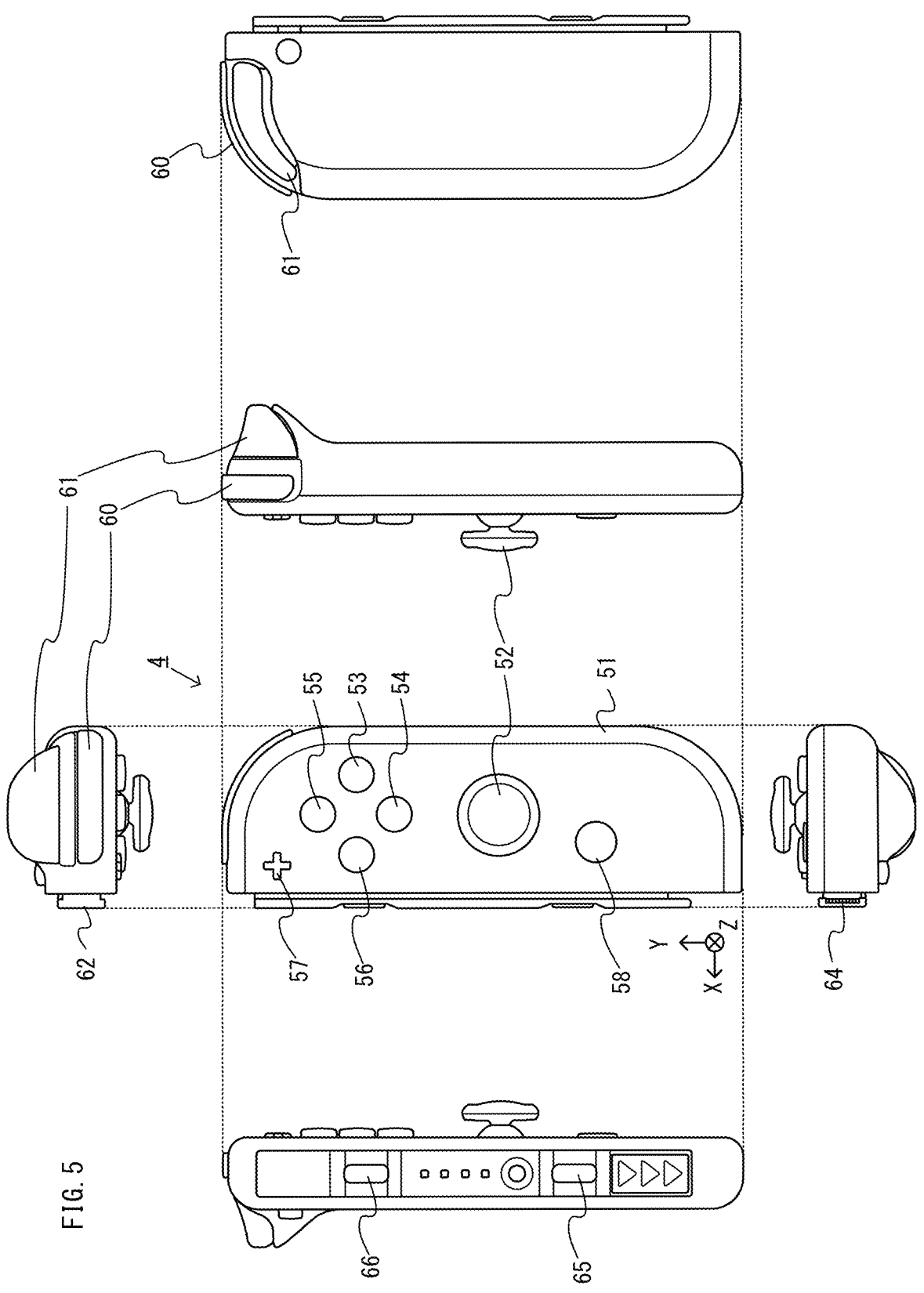
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In the embodiment, the housing 51 has a vertically long shape, that is, a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In the embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
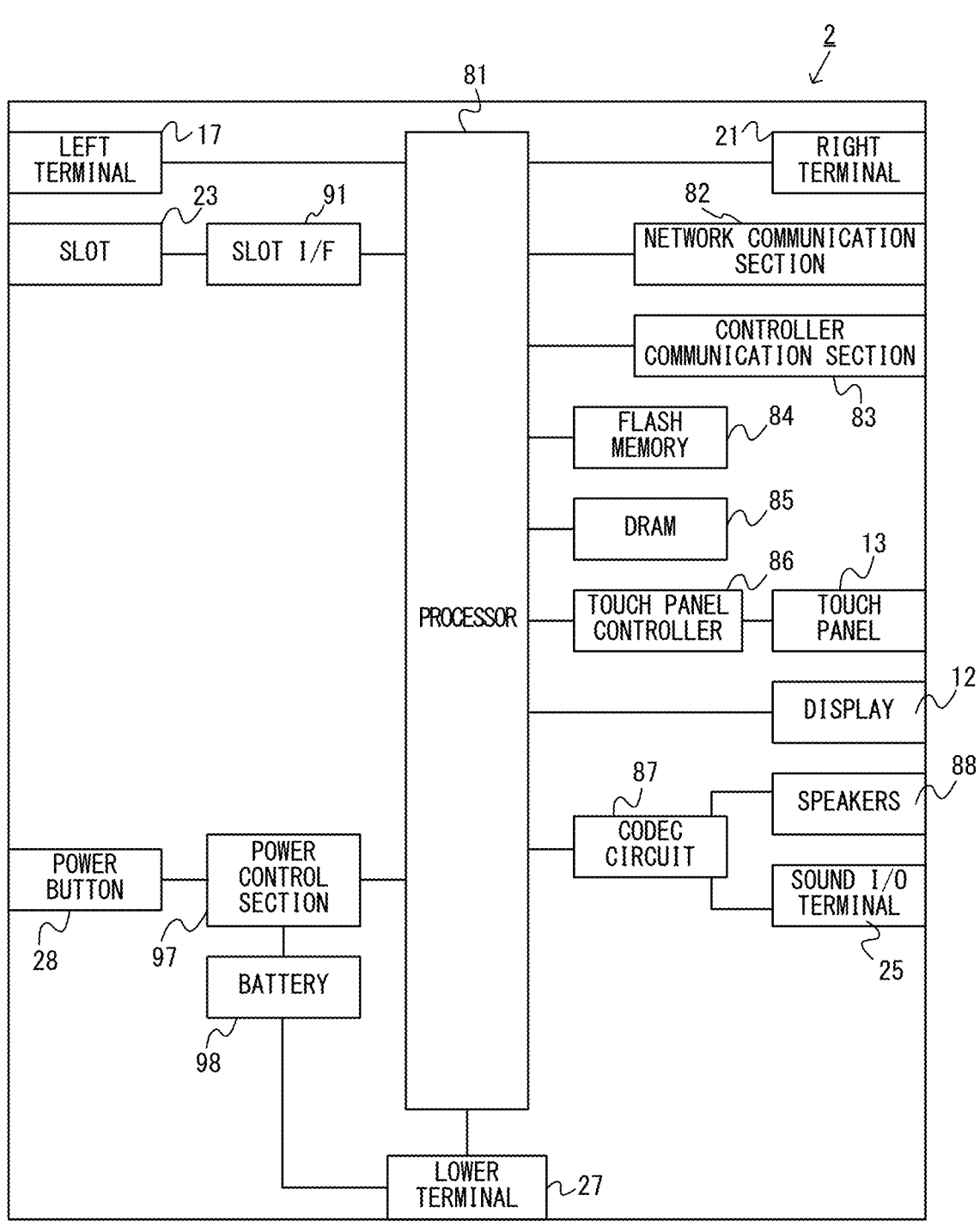
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot OF 91 is connected to the processor 81. The slot OF 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In the embodiment, as a first communication manner, the network communication section 82 is connected to a wireless LAN (Local Area Network) to perform communication with external apparatus by a system in conformity with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed LAN, and a plurality of main body apparatus 2 perform communication directly with each other to transmit and receive data.

The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in the embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in the embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., a cradle) is connected to the lower terminal 27, and power is supplied to the main body apparatus 2 via the lower terminal 27, the battery 98 is charged with the supplied power.

Figure 7:
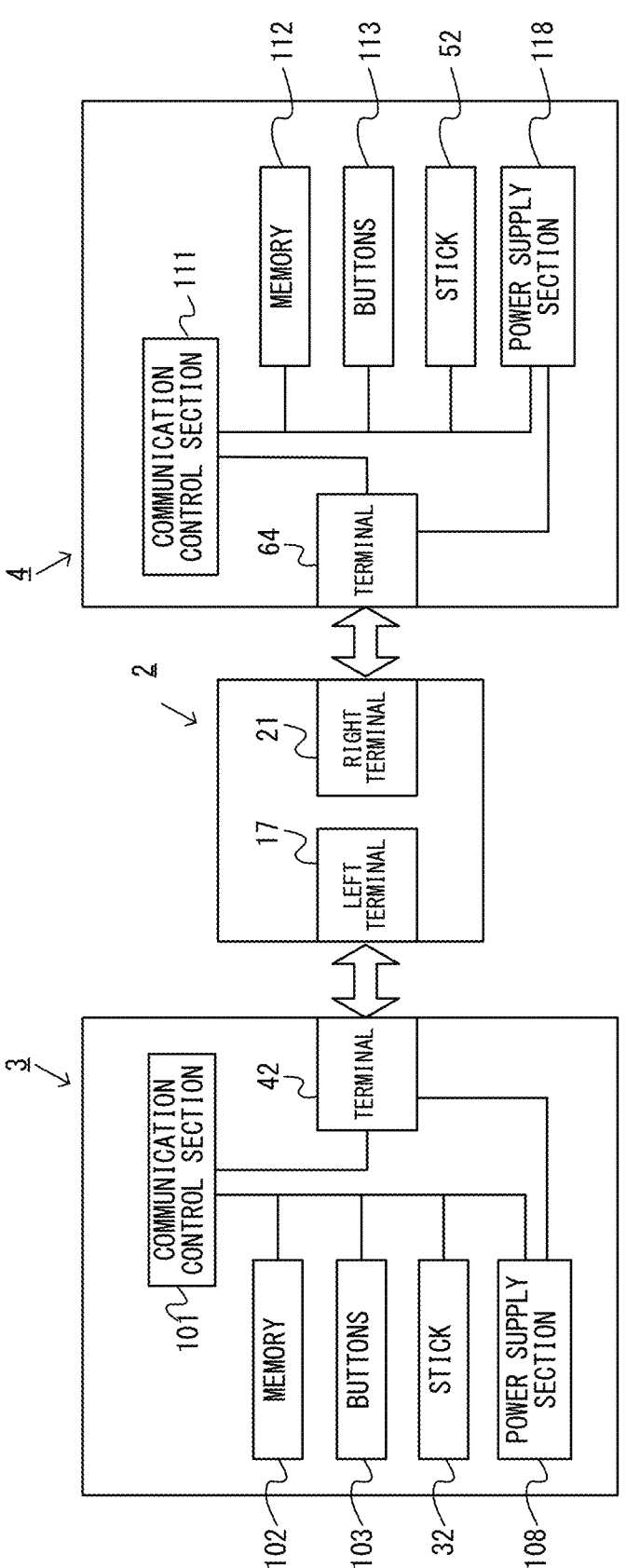
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In the embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example.

Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined time period. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 comprises a power supply section 108. In the embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

The right controller 4 comprises a power supply section 118. The power supply section 118 has a function similar to the power supply section 108 of the left controller 3, and operates similarly to the power supply section 108.

Figure 8:
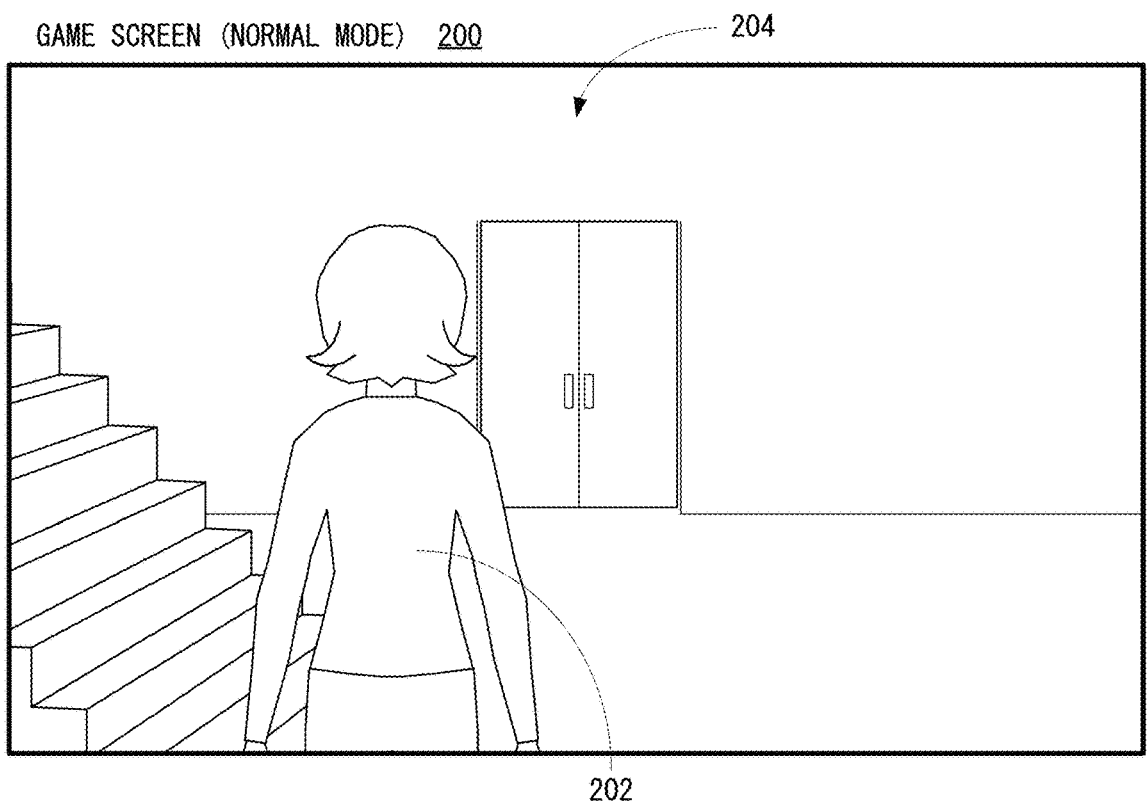
FIG. 8 is a view showing a non-limiting example game screen in a normal mode.

Next, with reference to FIG. 8-FIG. 21, an outline of game processing of a virtual game and the control of a virtual camera 250 executed in the game system 1 in this embodiment. FIG. 8 is a view showing a non-limiting example game image displayed on a display (e.g., the display 12) when executing an application of the virtual game of the embodiment.

The main body apparatus 2 functions also as an image processing apparatus, and generates and outputs (displays) display image data corresponding to various screens such as a game image. The processor 81 arranges various kinds of objects and characters in a three-dimensional virtual space, thereby to generate a certain sight or situation (scene). An image that this scene is shot by a virtual camera (viewed from a viewpoint) is displayed on the display 12 as the game image.

A game image shown in FIG. 8 is an example of a game screen 200, and the game screen 200 includes a player character 202 and a plurality of background objects 204. Moreover, an item and/or a non-player character may be included in the game screen 200.

The player character 202 is an object or character whose an action or operation is controlled by a player. In the embodiment, the player character 202 is a main character imitating a human being. As the action or operation of the player character 202, in a certain virtual place, i.e., a virtual space, moving, acquiring an item, passing an item to a non-player character, acquiring an item from a non-player character, talking with a non-player character, etc. correspond. Moreover, in the embodiment, the item includes various objects, such as a tool, treasure, and money that player character 202 or the non-player character uses or possesses.

Moreover, the non-player character is an object or character whose an action or operation is controlled by a computer (processor 81 of FIG. 6), not by the player. As an example, the non-player characters include an object or character imitating a human being except the player character 202, and an object or character imitating fishes, birds and insects. As the action or operation of the non-player character, moving, acquiring an item from the player character 202, passing an item to the player character 202, being imaged by a camera provided in a handheld terminal (not shown) that the player character 202 possesses, being caught by the player character 202, etc. correspond.

The background objects 204 include objects constituting a background, such as figurines, vehicles, terrains, etc. that are arranged in the virtual space. The figurines include signboards, plaques, stone structures, stone monuments, pots, antiques, vases, paintings, hanging scrolls, etc. The vehicles include bicycles, motorcycles, automobiles, trains, horse-drawn carriages, trolleys, ships, airplanes, etc. The terrains include ground (including roads, land, flower gardens, farmland, etc.), slopes, floors, trees, grass, flowers, buildings, stairs, bridges, rivers, ponds, holes, caves, cliffs, pillars, walls, fences, etc.

In an example shown in FIG. 8, a floor object, a wall object, a stair object and a door object are provided as the background object 204. Hereinafter, in this specification, in describing the background object 204, i.e., the object of the figurines, the vehicles and the terrains, only a name of the figurines, the vehicles or the terrain will be described, and the word "object" will be omitted.

In the embodiment, when a game mode is a mode that a normal game is being played (hereinafter, referred to as "normal mode"), the player moves the player character 202 in the virtual space, thereby to advance a virtual game by executing or advancing a predetermined event. As an example, the player character 202 is moved in a direction that the analog stick 32 is tilted. Although a detailed description is omitted, by operating each button 113, the player character 202 is caused to execute an action or operation (but, except for movement) having been set in advance.

Moreover, in the embodiment, the predetermined event includes arbitrary occurrences that occur during the game, and is executed (or started) by solving a trick, puzzle or riddle set in a predetermined background object 204 having been arranged in the virtual space. Specifically, the predetermined event includes occurrences, such as acquiring a predetermined item by the player character 202, obtaining a hint for solving by the player character 202 the trick or riddle, opening of a door, appearing of secret entrance or exit, stone falling, stone monument moving, moving or deforming of movable bridge, etc. When executing (or starting) such a predetermined event, a game screen 200 showing a manner that the predetermined event is advanced is displayed.

Thus, an operation by the player causes the player character 202 to inspect the background object 204, or to perform a predetermined action or operation with respect to the background object 204. This makes the predetermined event set to the background object 204 be executed, and the virtual game is advanced. Then, the virtual game is completed when the final goal is achieved.

Moreover, in the normal mode, the player can control the virtual camera 250 to move and zoom on the virtual camera 250. In the normal mode, as an example, the virtual camera 250 may be moved in a direction that the analog stick 52 is tilted, and zoomed-in by the L button 38 and zoomed-out by the R button 60.

Moreover, the player can shoot a part of the game screen 200 (capture or screenshot) by changing the game mode to the shooting mode. In the virtual game, a part of the game screen 200 may be shot using a predetermined item that the player possesses. This is for shooting what may become a hint for solution of a riddle displayed on the game screen 200. Although a detailed description is omitted, the predetermined item that the player character 202 possesses is a handheld terminal, and specifically, may be a virtual object imitating a game machine with a camera, a smartphone with a camera or a tablet with a camera.

Figure 9:
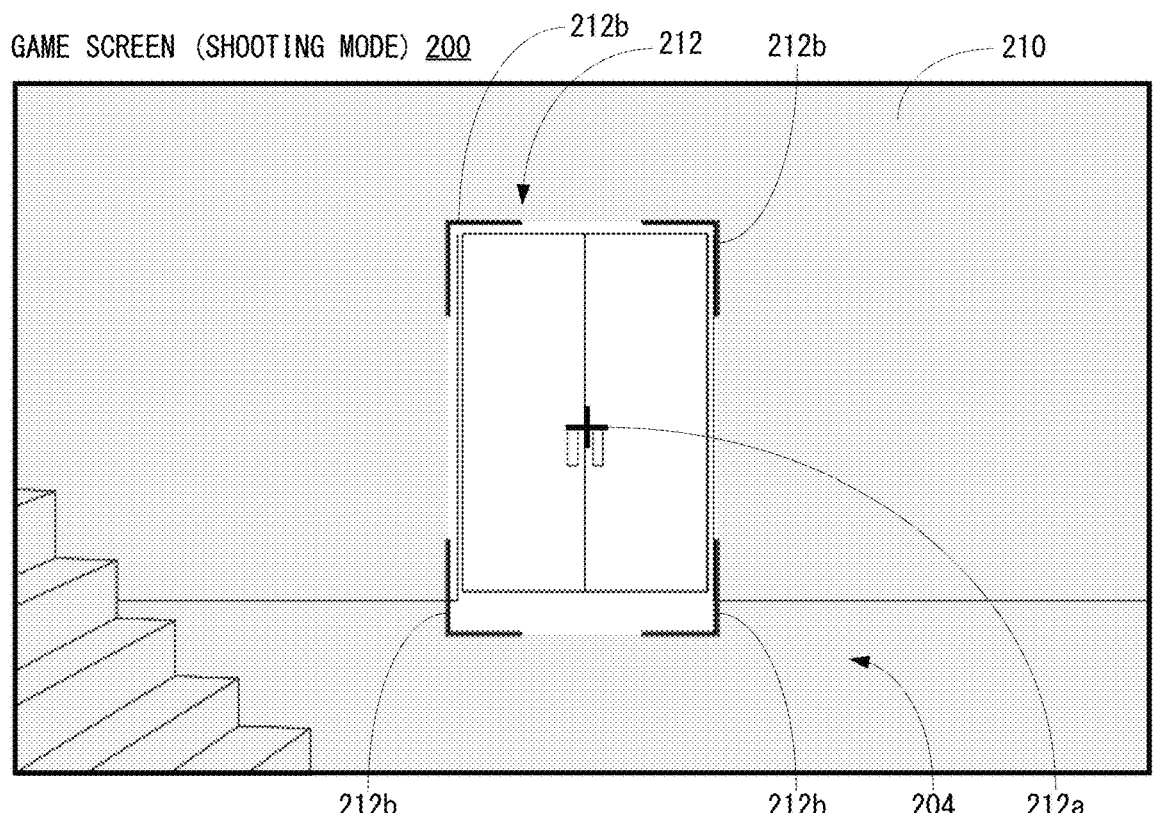
FIG. 9 is a view showing a non-limiting example game screen in a shooting mode.

FIG. 9 is a view showing a non-limiting example game screen 200 in the shooting mode. The game screen 200 shown in FIG. 9 becomes to be displayed on the display 12 when the game mode is changed to the shooting mode in a case where the game screen 200 shown in FIG. 8 is being displayed on the display 12. As an example, if the ZL button 39 is operated when the game mode is the normal mode, the game mode is changed to the shooting mode.

As shown in FIG. 9, in the shooting mode, the game screen 200 that a finder image 210 is superposed on the background object 204 in a front side is displayed on the display 12. The finder image 210 includes a pointing image 212 that functions as a viewfinder. The pointing image 212 includes a cross-shaped image 212*a* that indicates a center position of the shooting, and four (4) L-letter-shaped images 212*b* that define a shooting range of a shape of a vertically long rectangular. Therefore, a part, not a whole, of the game screen 200 is imaged. Although the shooting range having a vertically long rectangular shape is set in the embodiment, a shooting range having a horizontally long rectangular shape may be set. Moreover, a whole of the game screen 200 (i.e., game image) may be shot.

Moreover, in the shooting mode, the player character 202 is not displayed in the game screen 200. This is for expressing that when the player character performs shooting using a camera provided on the handheld terminal, the player character holds the handheld terminal in front of the face and looks at a through image that is displayed on a display provided on this handheld terminal. That is, in the shooting mode, the game screen 200 is displayed, in which the player character 202 looks the virtual space of the shooting range through the display of the handheld terminal and also directly looks the virtual space of an outer part of the handheld terminal. Moreover, the shooting mode is intended to save an image(s) that a hint etc. that the player has searched is shot, and to prevent the image of the player character 202 from interfering with shooting.

In the game screen 200 in the shooting mode, a part of the pointing image 212, i.e., a portion except the shooting range is translucent. As an example, the finder image 210 is arranged in a position in a near clipping plane, and a portion outside the pointing image 212 is made to be translucent. In FIG. 9, the translucent portion is filled with gray.

Therefore, in the shooting mode, the player can change a shooting direction of the camera (in this embodiment, the virtual camera 250) provided on the handheld terminal while looking at the game image in the outside of the pointing image 212. The shooting direction of the camera provided on the handheld terminal can be changed by changing a direction of the handheld terminal, changing a position of the handheld terminal, or performing the both. As an example, the direction of the handheld terminal can be changed by operating the analog stick 52. Moreover, the position of the handheld terminal can be changed by operating the analog stick 32.

Moreover, in the shooting mode, it is possible for the player to shoot the game image in the shooting range by operating the A button 53. A shot image is saved in a virtual album.

Furthermore, in the shooting mode, it may be made to perform zooming on the camera provided in the handheld terminal.

Moreover, the shooting mode can also be changed (or selected) from the menu mode. The menu mode is a game mode for selecting various kinds of menus, and if the X button 55 is operated when the game mode is being the normal mode, the game mode is changed to the menu mode.

Figure 10:
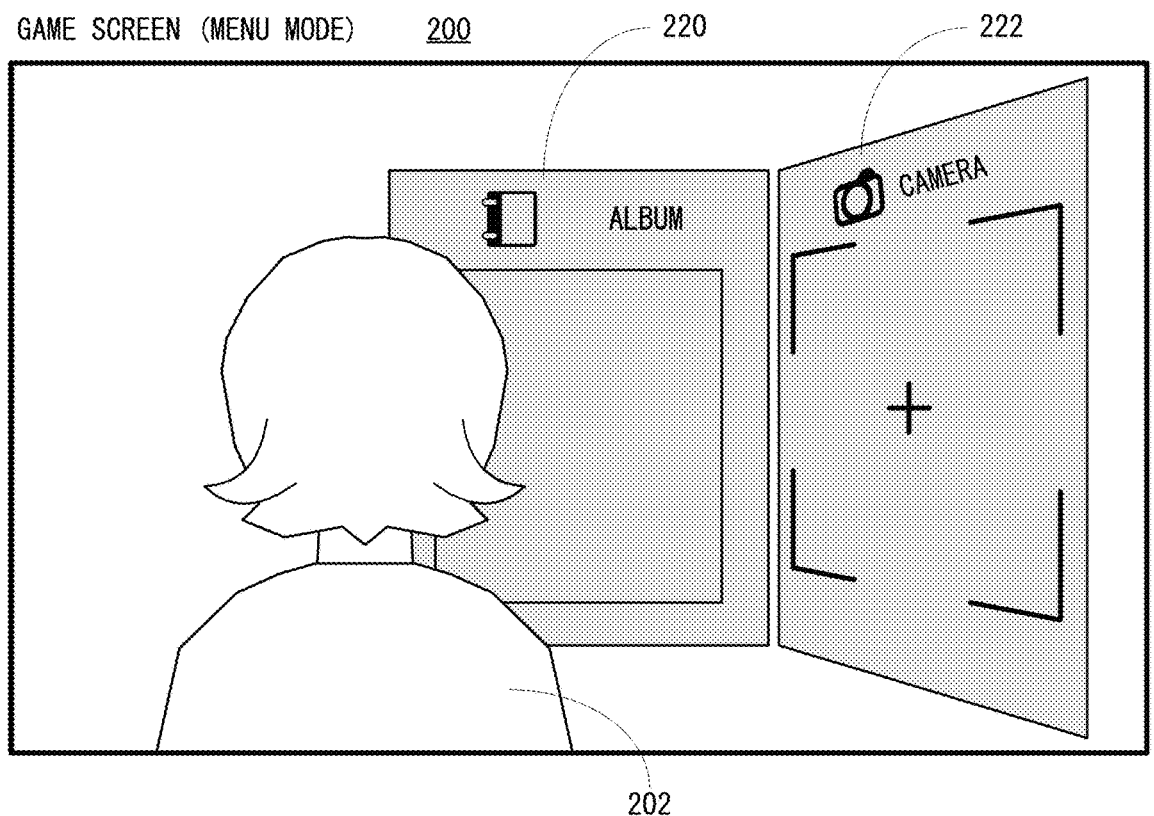
FIG. 10 is a view showing a non-limiting example game screen in a menu mode.

FIG. 10 is a view showing a non-limiting example game screen 200 in the menu mode. The game screen 200 shown in FIG. 10 is displayed on the display 12 if the game mode is changed to the menu mode when the game screen 200 of the normal mode shown in FIG. 8 is being displayed. As an example. if the X button 55 is operated when the game mode is the normal mode, the game mode will be changed to the menu mode.

In the game screen 200 shown in FIG. 10, a menu icon 220 and a menu icon 222 are arranged in front of the player character 202. That is, a game image (i.e., menu image) is generated, in which a plurality of menu icons (here, menu icons 220 and 222) are drawn between the player character 202 and the background object 204 in virtual space. The menu icon 220 is an icon for selecting an album function, and the menu icon 222 is an icon for selecting a camera function, i.e., the shooting mode.

In this embodiment, a plurality of menu items, i.e., a plurality of menu icons displayed on the display of the handheld terminal that the player character 202 uses are projected onto the game screen 200 in the menu mode. Moreover, the game screen 200 in the menu mode is displayed in a manner that the player looks over the shoulder of the player character 202 the menu icons. Therefore, the player feels as if performing selection of the menu icons together with the player character 202. That is, a sense of immersion of the player is increased.

The menu icons 220, 222, --- are displayed also translucent, and although omitted in FIG. 10, the player can see the background object 204 arranged behind the menu icons 220 and 222. As described above, since FIG. 10 shows the game screen 200 in a case of changing to the menu mode when the game screen 200 of FIG. 8 is being displayed, the background object 204 as similar to the game screen 200 shown in FIG. 8 is displayed behind the menu icons 220 and 222.

Therefore, in the menu mode, it is possible for the player to confirm the game image behind the menu icons 220, 222, --- (i.e., background object 204), and to determine whether the shooting is to be performed as is by selecting the camera function.

In the game screen 200 in the menu mode, a menu currently displayed in front of the player character 202 (menu icon 220 in FIG. 10) is selectable. The player moves the menu icons 220, 222, --- in right and left when making other menus selectable. As an example, the menu icons 220, 222, --- are moved to the left or the right by operating the left button 36 or the right button 33.

If the A button 53 is operated in a state where a desired menu is selectable, the desired menu is selected. When the album function is selected, it is possible to display and look a shot image having been shot in the shooting mode. Moreover, when the camera function is selected, the game mode is changed to the shooting mode and the game screen 200 in the shooting mode is displayed on the display 12. When the menu mode is selected in the game screen 200 of the normal mode shown in FIG. 8, the camera function is selected in the menu mode, the game screen 200 in the shooting mode as shown in FIG. 9 is displayed on the display 12.

Figure 11:
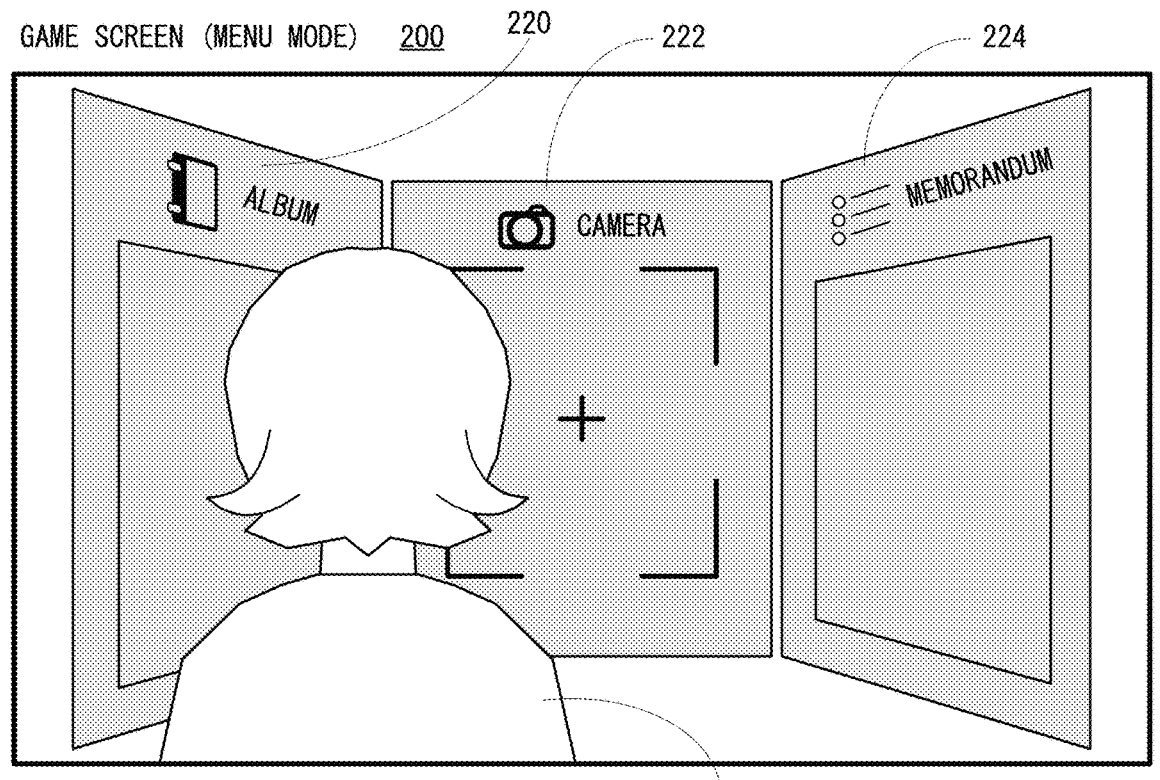
FIG. 11 is a view showing another non-limiting example game screen in the menu mode.

FIG. 11 is a view showing a further nom-limiting example game screen 200 in the menu mode. If the right button 33 is operated in a state where the game screen 200 in the menu mode shown in FIG. 10 is being displayed on the display 12, in order to change a menu in the right side to a selectable menu, as shown in FIG. 11, a plurality of menus (in this embodiment, menu icons 220, 222 and 224) are moved to the left when viewed from the player or the player character 202. Moreover, if the left button 36 is operated in a state where the game screen 200 in the menu mode shown in FIG. 10 is being displayed on the display 12, in order to change a menu in the left side to a selectable menu, as shown in FIG. 10, a plurality of menus are moved to the right when viewed from the player or the player character 202. Although a detailed description is omitted, the menu icons not arranged in the front of the player character 202 (in FIG. 11, menu icons 220 and 224) are also arranged obliquely to face a side of the player character 202.

In the game screen 200 shown in FIG. 11, the menu icon 222 is arranged in the front of the player character 202, and the menu icon 224 is displayed in addition to the menu icon 220 are 222. The menu icon 224 is an icon for selecting a memorandum function. When the memorandum function is selected, it is possible to obtain a memorandum of a shot image that is shot in the shooting mode, and view the obtained memorandum.

In addition, although the game screens 200 shown in FIG. 10 and FIG. 11 show an example that three (3) menus are provided, as long as it includes the camera function at least, two (2) or more than four (4) menus may be made to be provided.

Figure 12A:
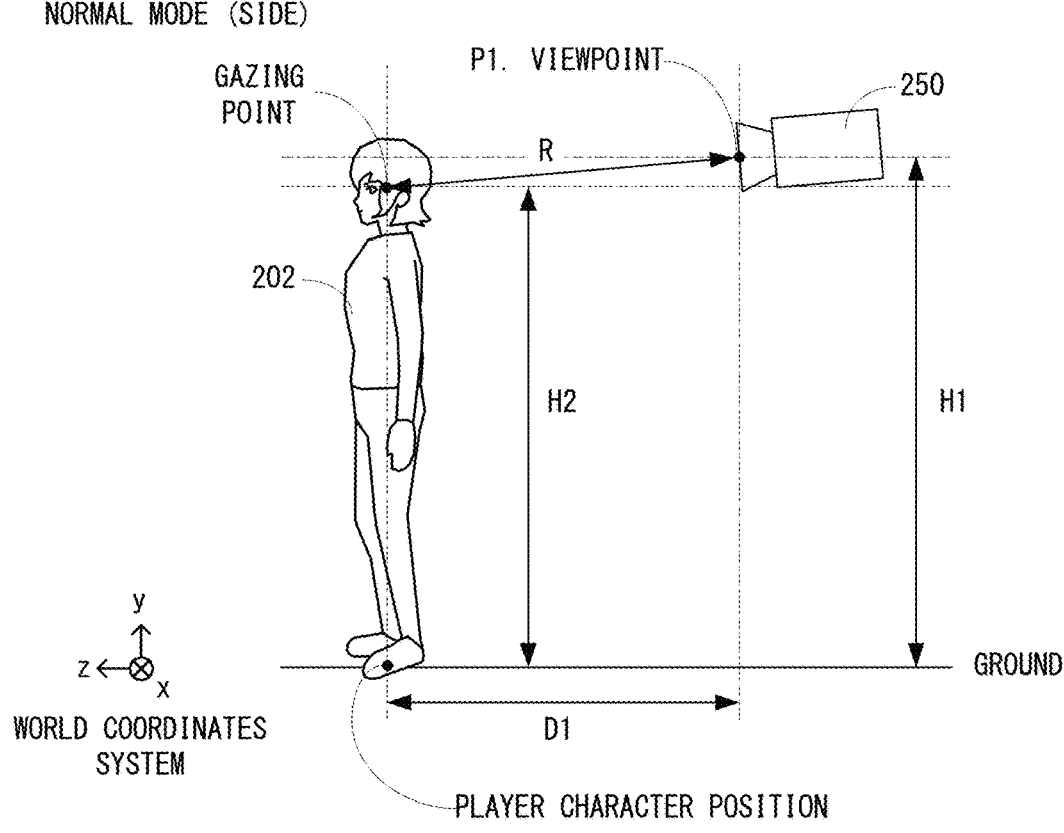
FIG. 12A is a view showing a non-limiting example positional relationship between a player character and a virtual camera within a virtual space in the normal mode viewed from side.
Figure 12B:
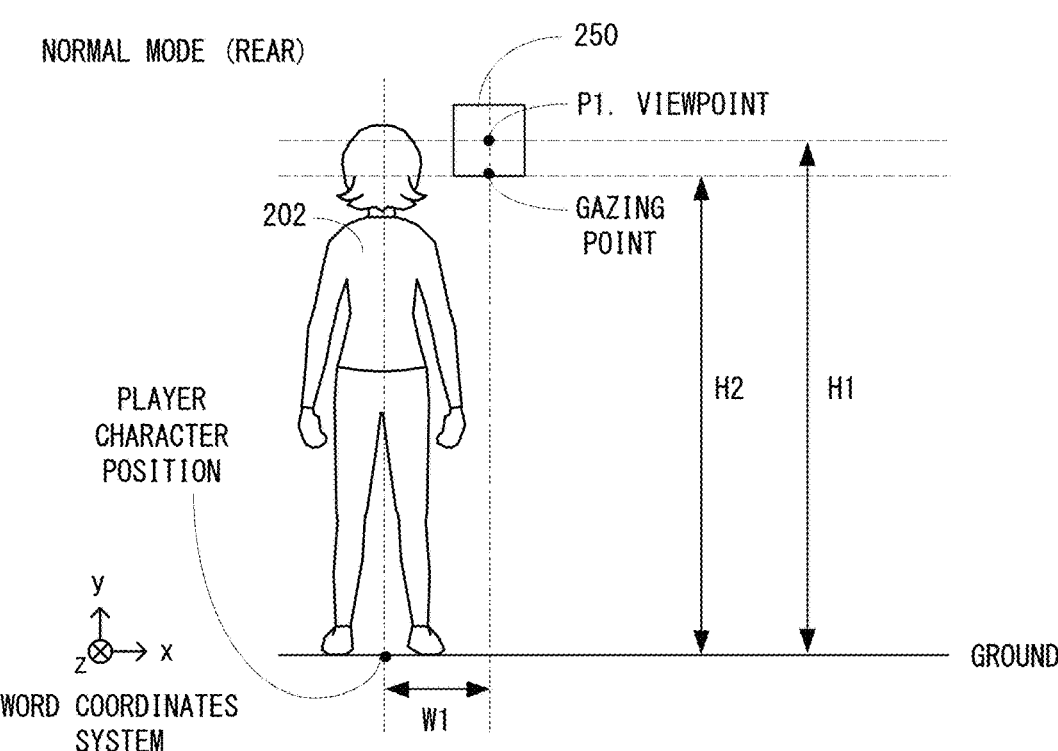
FIG. 12B is a view showing the non-limiting example positional relationship between the player character and the virtual camera within the virtual space in the normal mode viewed from back.

FIG. 12A is a view showing a non-limiting example positional relationship between the player character 202 and the virtual camera 250 in the virtual space in the normal mode, which being viewed from side. FIG. 12B is a view showing the non-limiting example positional relationship between the player character 202 and the virtual camera 250 in the virtual space in the normal mode, which being viewed from back.

As shown in FIG. 12A and FIG. 12B, the world coordinate system is set in the virtual space, and a horizontal plane including x-axis and z-axis or a plane parallel to the horizontal plane is an xz plane, and a y-axis is set perpendicular to the x-axis and z-axis (i.e., the xz plane). This is also the same for FIG. 13A, FIG. 13B, FIG. 14A and FIG. 14B described later.

As shown in FIG. 12A and FIG. 12B, in the normal mode, the virtual camera 250 is arranged behind the player character 202 in the virtual space at the beginning of starting the virtual game (i.e., initial state). Specifically, the virtual camera 250 (i.e., view point) is arranged at a position P1 (hereinafter, may be referred to as "normal mode position"), the position P1 being a position of a horizontal distance in the z-axis direction from the position of the player character 202 is a distance D1 and a height H1 from the foot position of the player character 202 (in the example shown in FIG. 12A and FIG. 12B, two (2) meters). Moreover, the direction of the virtual camera 250 is set so as to view with a bird's-eye a position in a slightly right side of the head of the player character 202 (i.e., gazing point). When the player does not move the virtual camera 250, the virtual camera 250 follows the player character 202 while maintaining this positional relationship.

However, the foot position of the player character 202 is the position of the player character 202. Moreover, the gazing point is set at a position that is displaced from the position of the player character 202 by a predetermined distance W1 (e.g., forty (40) centimeters in the virtual space) in a positive direction of the x-axis and at a height H2 of the eye of the player character 202 (e.g., one-hundred and seventy (170) centimeters in the virtual space). However, the height H2 is a distance from the foot position of the player character 202 to a position of its eyes.

In the normal mode, when the virtual camera 250 is moved according to an operation of the player, the position and the direction of the virtual camera 250 are changed so that the virtual camera 250 may face to the gazing point while maintaining a distance R between the position of the virtual camera 250 and the gazing point (e.g., two (2) meters in the virtual space). That is, the virtual camera 250 is moved on a spherical surface having a radius of the distance R centering on the gazing point. However, the movement of the virtual camera 250 is restricted in a case where the virtual camera 250 penetrates or is buried the background object 204 such as the ground or floors, the walls or the pillars. This is also the same for other cases that the virtual camera 250 is moved.

Moreover, as described above, in the normal mode, the virtual camera 250 is zoomed in with the L button 38 and zoomed out with the R button 60. When the player zooms in on the virtual camera 250, an angle of view of the virtual camera 250 is made large, and when the player zooms out on the virtual camera 250, the angle of view of the virtual camera 250 is made small.

However, in the normal mode, when zooming on the virtual camera 250, the virtual camera 25 may be moved in a direction closing to the gazing point or in a direction keeping away from the gazing point. That is, the distance R between the position of the virtual camera 250 and the gazing point may be changed.

When the player moves the virtual camera 250, a positional relationship with the player character 202 is changed, and the virtual camera 250 follows the player character 202 with maintaining the changed positional relationship.

In addition, when the player resets the position and the direction of the virtual camera 250, the position and the direction of the virtual camera 250 to the player character 202 are returned to an initial state.

Figure 13A:
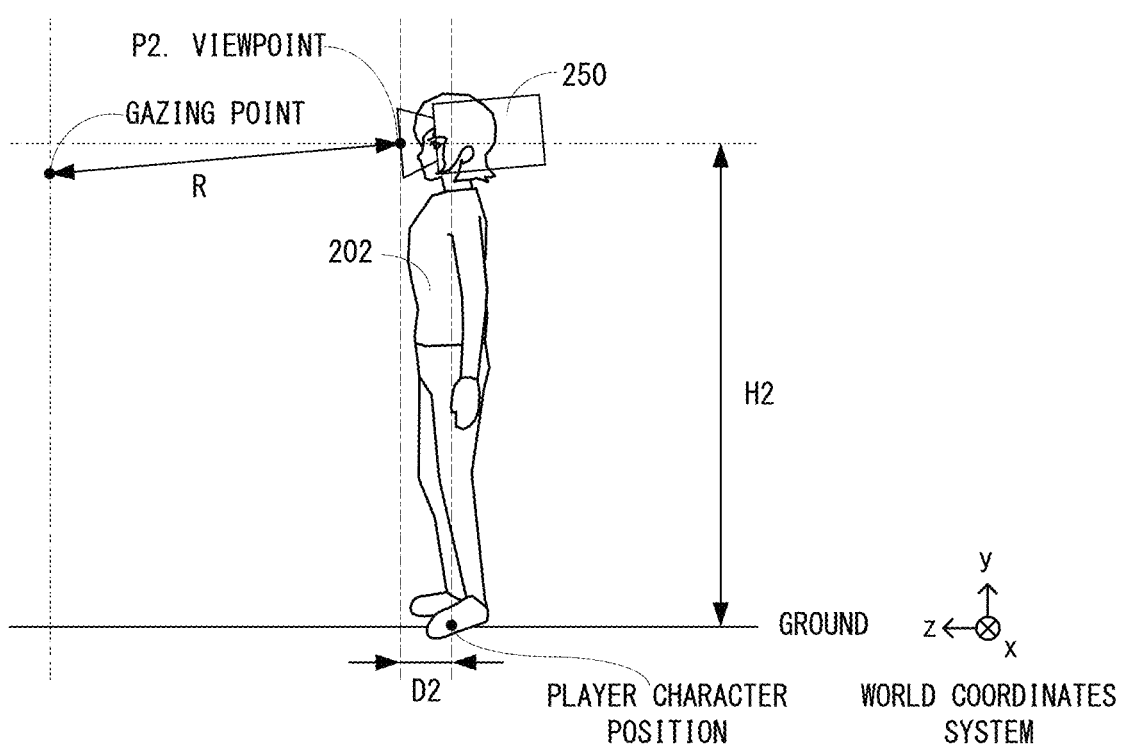
FIG. 13A is a view showing a non-limiting example positional relationship between the player character and the virtual camera within the virtual space in the shooting mode viewed from side.
Figure 13B:
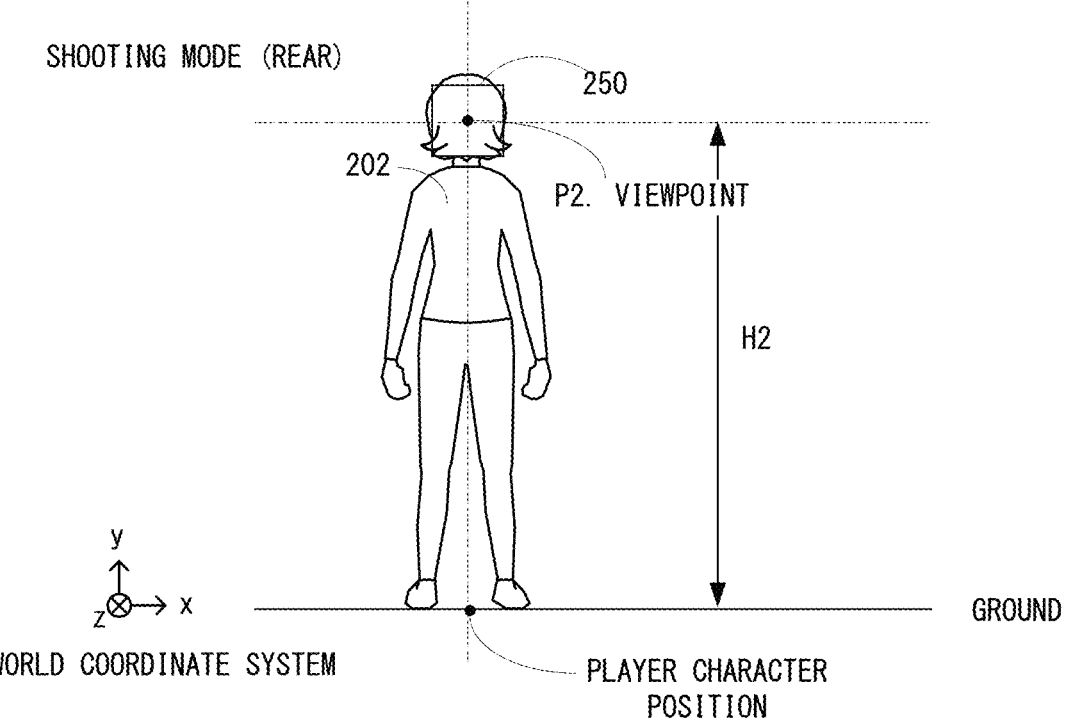
FIG. 13B is a view showing the non-limiting example positional relationship between the player character and the virtual camera within the virtual space in the shooting mode viewed from back.

FIG. 13A is a view showing a non-limiting example positional relationship between the player character 202 and the virtual camera 250 in the virtual space in the shooting mode, which being viewed from side. FIG. 13B is a view showing the non-limiting example positional relationship between the player character 202 and the virtual camera 250 in the virtual space in the shooting mode, which being viewed from back.

As shown in FIG. 13A and FIG. 13B, in the shooting mode, the position of the virtual camera 250 is arranged slightly forward of the head or eye of the player character 202 in the virtual space. Specifically, the virtual camera 250 is arranged at a position P2 (hereinafter, may be referred to as "shooting mode position"), the position P2 being a position of a predetermined distance D2 (e.g., forty (40) centimeters in the virtual space) from the player character 202 forward of the player character 202 (in the positive direction of the z-axis in the example shown in FIG. 13A and FIG. 13B) and the height H2 of the eye of the player character 202. That is, the virtual camera 250 is arranged at a position that is forward toward the direction of the virtual camera 250 than the normal mode position and in front of the player character 202. Specifically, the virtual camera 250 is arranged at a position for displaying the game screen 200 of a case where the player character 202 is holding a handheld terminal in front of the face of the player character 202 and shooting. Therefore, the subject in the virtual space is enlarged and displayed.

Moreover, the gazing point is set, at the beginning of changing to the shooting mode, at a position forward by a distance R from the position of the virtual camera 250 in the shooting mode and in a direction of the virtual camera 250 in the normal mode immediately before changing to the shooting mode, or a direction of the virtual camera 250 in the menu mode immediately before changing to the shooting mode (in the example shown in FIG. 13A and FIG. 13B, in the positive direction of the z-axis). That is, the gazing point is also moved in parallel with the position of the virtual camera 250. That is, the direction of the virtual camera 250 in the normal mode or the menu mode is maintained at the beginning of changing to the shooting mode so that a desired image of the game screen 200 in the normal mode or the menu mode can be shot.

Moreover, as described above, in also the shooting mode, the player can control the position and direction of the camera provided on the handheld terminal, i.e., the virtual camera 250.

In the shooting mode, the position of the virtual camera 250 is moved together with the position of the player character 202 by tilting the analog stick 32. Therefore, as described later, even when changing to the normal mode, the hints etc. found during the shooting mode are not lost.

Moreover, in the shooting mode, the direction of the virtual camera 250 is changed to a direction that the analog stick 52 is tilted. Specifically, the gazing point is moved in a direction that the analog stick 52 is tilted with maintaining the distance R with the position of the virtual camera 250, and the direction of the virtual camera 250 is set to a direction looking at this gazing point.

Figure 14A:
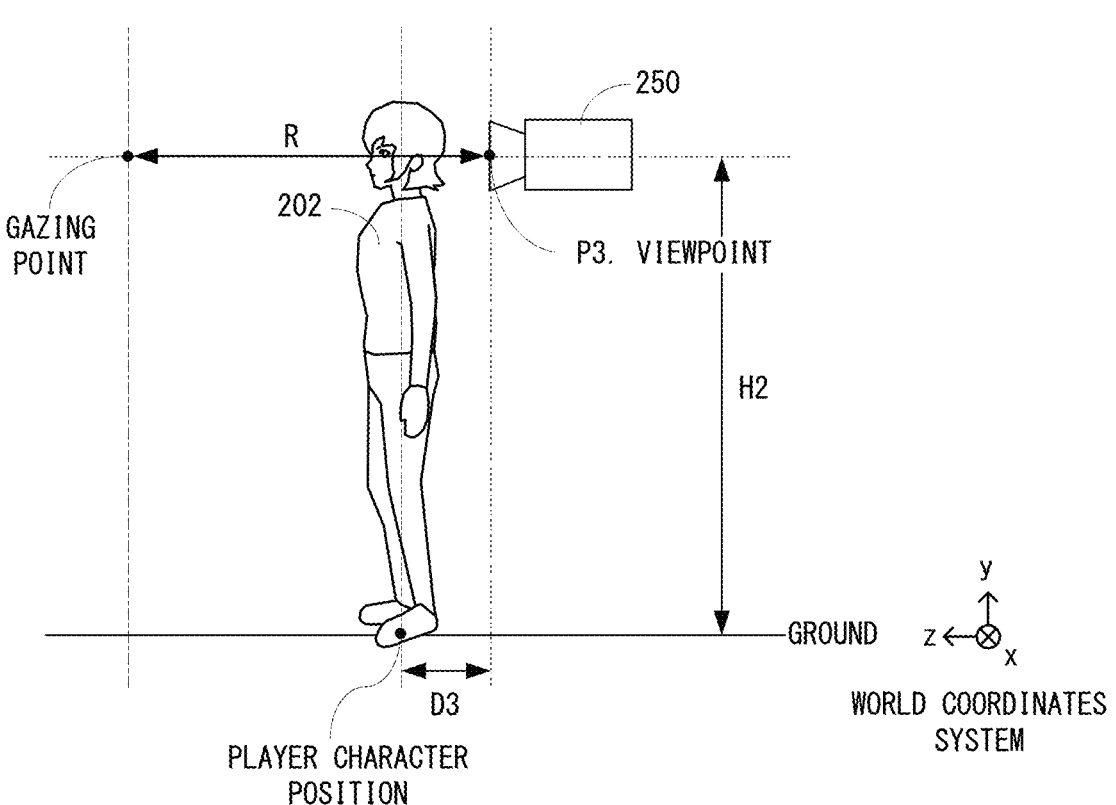
FIG. 14A is a view showing a non-limiting example positional relationship between the player character and the virtual camera within the virtual space in the menu mode viewed from side.
Figure 14B:
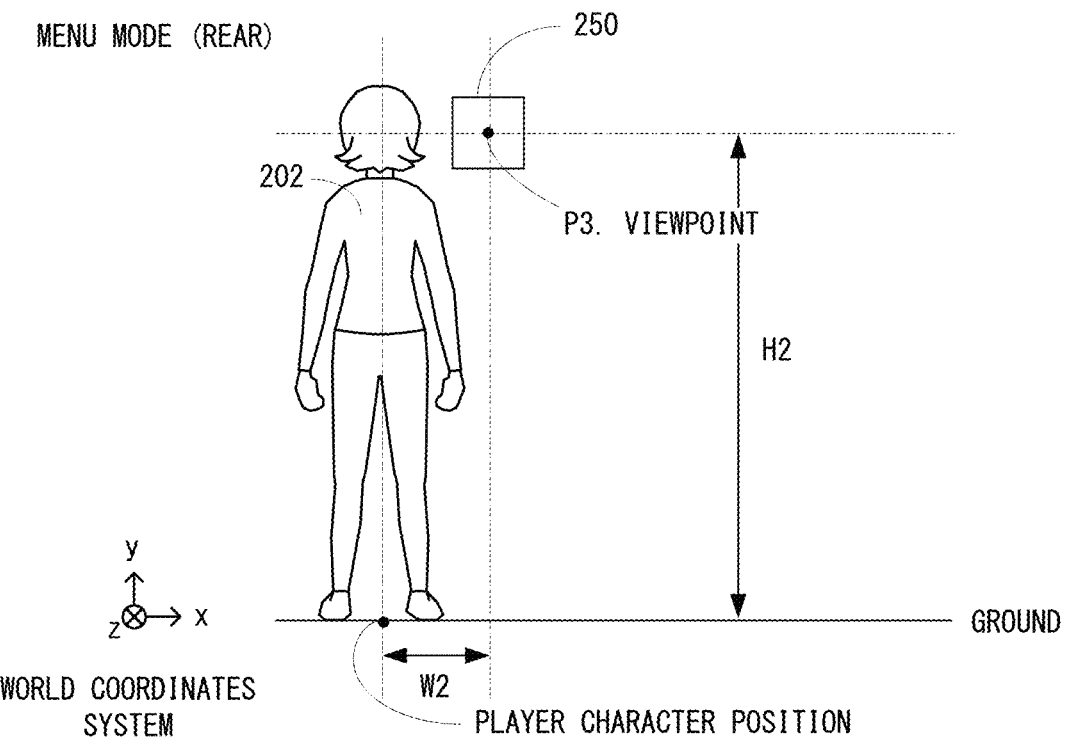
FIG. 14B is a view showing the non-limiting example positional relationship between the player character and the virtual camera within the virtual space in the menu mode viewed from back.

FIG. 14A is a view showing a non-limiting example positional relationship between the player character 202 and the virtual camera 250 in the virtual space in the menu mode, which being viewed from side. FIG. 14B is a view showing the non-limiting example positional relationship between the player character 202 and the virtual camera 250 in the virtual space in the menu mode, which being viewed from back.

As shown in FIG. 14A and FIG. 14B, in the menu mode, the virtual camera 250 is arranged behind the player character 202 in the virtual space. Specifically, the virtual camera 250 is set at a position P3 (hereinafter, may be referred to as "menu mode position"), the position P3 being a position of a predetermined distance D3 (e.g., forty (40) centimeters in the virtual space) from the player character 202 backward of the player character 202 (in the negative direction of the z-axis in the example shown in FIG. 14A and FIG. 14B) and a predetermined distance W2 (e.g., forty (40) centimeters in the virtual space) from the player character 202 rightward of the player character 202 (in the positive direction of the x-axis in the example shown in FIG. 14A and FIG. 14B) and the height H2 of the eye of the player character 202.

In addition, although the predetermined distance W1 and the predetermined distance W2 are set as the same length in the virtual space in this embodiment, the predetermined distance W2 may be set shorter than the predetermined distance W1.

Moreover, in the menu mode, the gazing point is set at a position straight ahead by a predetermined distance R from the position of the virtual camera 250 in the menu mode in a direction of the player character 202 in the normal mode immediately before changing to the menu mode (in the example shown in FIG. 14A and FIG. 14B, in the positive direction of the z-axis).

In this embodiment, it is impossible to change the position and the direction of the player character 202 in the menu mode. Therefore, in the menu mode, the position and the direction of the virtual camera 250 are not changed. Moreover, it is impossible to zoom on the virtual camera 250 in the menu mode. That is, operations of the L button 38 and the R button 60 are made invalid. However, the position, the direction and the zooming of the virtual camera 250 also may be made to be controlled in the menu mode.

As described above, in the shooting mode and the menu mode, the virtual camera 250 is arranged in a position having a predetermined positional relationship to the position of the player character 202. Moreover, at the time that the game mode is changed to the shooting mode, and in the menu mode, the direction of the virtual camera 250 is set to a predetermined direction.

In this embodiment, the game mode is changed between the normal mode, the menu mode and the shooting mode by an operation of the player.

As described above, if the ZL button 39 is operated when the game mode is the normal mode, the game mode is changed to the shooting mode. If the X button 55 is operated when the game mode is the normal mode, the game mode is changed to the menu mode.

If the camera function is selected when game mode is the menu mode, i.e., if the A button 53 is operated in a state where the menu icon 222 is selectable, the game mode is changed to the shooting mode. Moreover, if the B button 54 or the X button 55 is operated when the game mode is the menu mode, the game mode is changed to the normal mode.

If the X button 55 is operated when the game mode is the shooting mode, the game mode is changed to the normal mode. Moreover, when the game mode has been changed from the normal mode to the shooting mode, if the B button 54 is operated in the shooting mode, the game mode is changed to the normal mode. Moreover, when the game mode has been changed from the menu mode to the shooting mode, if the B button 54 is operated in the shooting mode, the game mode is changed to the menu mode. That is, the B button 54 is operated in the shooting mode in order to return from the shooting mode to the immediately before game mode.

When changing from the shooting mode to the normal mode, the direction of the player character 202 is set (or returned) to a direction of the player character 202 in the normal mode immediately before changing to the shooting mode. Moreover, when changing from the shooting mode to the menu mode, the direction of the player character 202 is set to a direction of the player character 202 in the shooting mode immediately before changing to the menu mode. That is, the direction that the player character 202 was last facing in the shooting mode is maintained.

Figure 15:
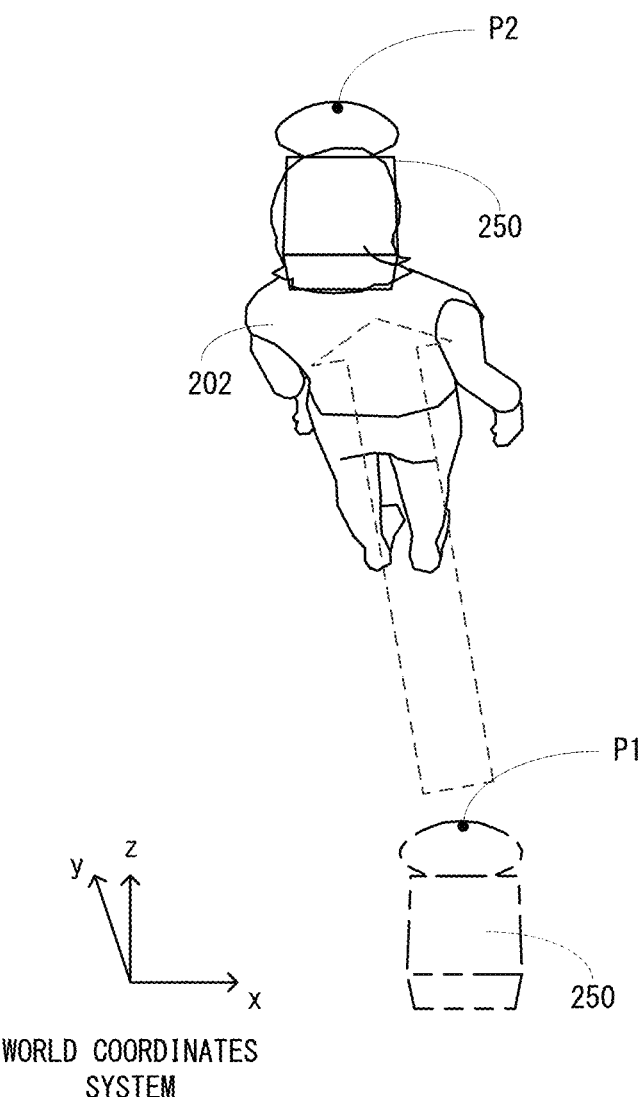
FIG. 15 is a view showing a non-limiting example positional relationship between the player character and the virtual camera when changing from the normal mode to the shooting mode viewed diagonally above the virtual space.

FIG. 15 is a view showing a non-limiting example movement of the position of the virtual camera 250 when the game mode is changed from the normal mode to the shooting mode viewed diagonally above the virtual space. FIG. 15 shows, as an example, a case where the virtual camera 250 is moved from the normal mode position P1 shown in FIG. 12A and FIG. 12B to the shooting mode position P2 shown in FIG. 13A and FIG. 13B. In FIG. 15, the virtual camera 250 of a state shown in FIG. 12A and FIG. 12B is indicated by a dotted line, and the player character 202 and the virtual camera 250 of a state shown in FIG. 13A and FIG. 13B are indicated by a solid line.

When the game mode is changed from the normal mode to the shooting mode, the virtual camera 250 is moved to a direction of a horizontal component of the direction of the virtual camera 250 in the normal mode (a direction of a line of sight) and a direction approaching the position of the player character 202. A position of the virtual camera 250 after movement, i.e., the shooting mode position P2 is calculated based on the normal mode position P1 and direction of the virtual camera 250 to be brought to a positional relationship as shown in FIG. 13A and FIG. 13B. The shooting mode position P2 of the virtual camera 250 is set at the distance D2 in front of the position of the player character 202 in the shooting mode and at the height H2 of the eye position of the player character. However, the position of the player character 202 in the shooting mode when the game mode is changed from the normal mode to the shooting mode is the position of the player character 202 in the normal mode immediately before changing to the shooting mode. Since the gazing point is set to a position moved by the distance W1 to the right side of the position of the player character 202 in the normal mode of this embodiment, when changing from the normal mode to the shooting mode, the virtual camera 250 is moved forward diagonally left toward the shooting mode position P2 from the normal mode position P1.

Thus, when changing from the normal mode to the shooting mode, with regardless of the direction of the player character 202, the virtual camera 250 is moved to a direction that the direction of the virtual camera 250 in the normal mode and the direction approaching the player character 202 in the normal mode are combined with each other. Therefore, when finding in the game screen 200 a desired image (or subject) such as the non-player character and/or the background object 204 temporally appearing in the virtual space in the normal mode, it is possible to shoot the desired image by immediately changing to the shooting mode.

However, the direction of the player character 202 is a direction that the player character 202 is being moved and a direction of the face (and front of torso) when the player character 202 is not moved.

In addition, as described above, when the game mode is changed from the normal mode to the shooting mode, the position of the gazing point is moved in parallel with the position of the virtual camera 250 in a case where the position of the virtual camera 250 in the normal mode is moved to the position of the virtual camera 250 in the shooting mode. This is also the same in a case where the game mode is changed from the menu mode to the shooting mode, a case where the game mode is changed from the shooting mode to the menu mode and a case where the game mode is changed from the menu mode to the normal mode.

Figure 16:
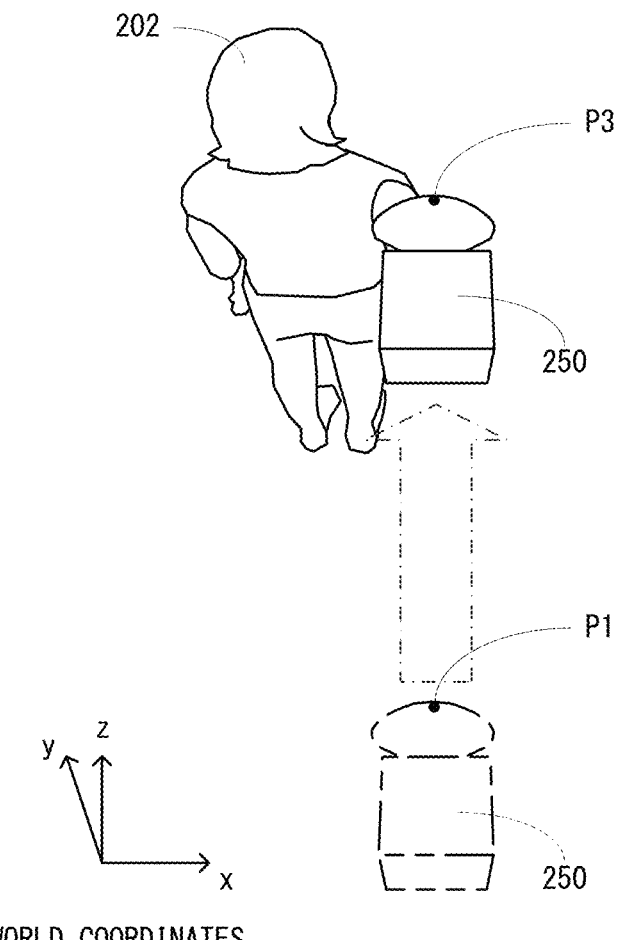
FIG. 16 is a view showing a non-limiting example positional relationship between the player character and the virtual camera when changing from the normal mode to the menu mode viewed diagonally above the virtual space.

FIG. 16 is a view showing a non-limiting example movement of the position of the virtual camera 250 in a case where the game mode is changed from the normal mode to the menu mode viewed from diagonally above the virtual space. FIG. 16 shows, as an example, a case where the virtual camera 250 is moved from the normal mode position P1 shown in FIG. 12A and FIG. 12B to the menu mode position P3 shown in FIG. 14A and FIG. 14B. In FIG. 16, the player character 202 and the virtual camera 250 of a state shown in FIG. 12A and FIG. 12B are indicated by a dotted line, and the player character 202 and the virtual camera 250 of a state shown in FIG. 14A and FIG. 14B are indicated by a solid line.

As described above, if the X button 55 is operated when the game mode is the normal mode, the game mode is changed to the menu mode. At this time, the virtual camera 250 is moved to a direction of the horizontal component of the direction of the player character 202 in the normal mode. Specifically, a position of the virtual camera 250 after movement is calculated based on the position and direction of the player character 202 so that a positional relationship as shown in FIG. 14A and FIG. 14B is obtainable. Then, the virtual camera 250 is moved toward the position of the virtual camera 250 after movement from the current position of the virtual camera 250.

Thus, when changing from the normal mode to the menu mode, with regardless of the position and direction of the virtual camera 250 in the normal mode, the virtual camera 250 is arranged at the predetermined position P3 that is based on the position and direction of the player character 202 in the normal mode.

In addition, the gazing point is set at a position straight ahead by the distance R from a position after movement of the virtual camera 250 in a direction toward the player character 202. The direction of the virtual camera 250 is set to look at this gazing point.

Moreover, when the predetermined distance W2 is set shorter than the predetermined distance W1 as described above, the virtual camera 250 is moved in a direction of the horizontal component of the direction of the player character 202 in the normal mode, and moved so as to slightly approach the player character 202.

FIG. 17 is a view showing a non-limiting example movement of the position of the virtual camera 250 when the game mode is changed from the menu mode to the shooting mode viewed from diagonally above the virtual space. FIG. 17 shows, as an example, a case where the virtual camera 250 is moved from the menu mode position P3 shown in FIG. 14A and FIG. 14B to the shooting mode position P2 shown in FIG. 13A and FIG. 13B. In FIG. 17, the virtual camera 250 of a state shown in FIG. 14A and FIG. 14B is indicated by a dotted line, and the player character 202 and the virtual camera 250 of a state shown in FIG. 13A and FIG. 13B are indicated by a solid line.

As described above, if the A button 53 is operated in a state where the menu icon 222 is selectable when the game mode is the menu mode, the game mode is changed to the shooting mode. At this time, the virtual camera 250 is moved from the menu mode position P3 toward a direction of the virtual camera 250 and a direction approaching the player character 202. That is, the virtual camera 250 is moved forward by a predetermined first distance (in this example, distance D2 plus (+) distance D3) and left by a predetermined second distance (in this example, distance W2) that is different from the predetermined first distance. In fact, the virtual camera 250 is moved from the menu mode position P3 toward a direction that the direction of the virtual camera 250 and the direction approaching the player character 202 in the menu mode are combined with each other. However, since the direction of the player character 202 and the direction of the virtual camera 250 are set to the same direction in the menu mode, when the game mode is changed from the menu mode to the shooting mode, the direction of the virtual camera 250 is not changed. In addition, the gazing point is moved in parallel with a movement of the virtual camera 250.

As described referring to FIG. 15-FIG. 17, when the game mode is changed from the normal mode to the shooting mode, the shooting mode position P2 and direction of the virtual camera 250 in the shooting mode are set based on the position of the player character 202 in the normal mode and the normal mode position P1 and direction of the virtual camera 250. Moreover, when the game mode is changed from the normal mode to the shooting mode via the menu mode, the menu mode position P3 and direction of the virtual camera 250 in the menu mode are set based on the position and direction of the player character 202, and furthermore, the shooting mode position P2 and direction of the virtual camera 250 are set by moving, from this menu mode position P3, the virtual camera 250 forward by the predetermined first distance and left by the predetermined second distance to the direction in the menu mode. That is, it is possible to start the shooting mode by selecting one of a plurality of starting methods that the positions and directions of the virtual camera 250 at the time of starting shooting differ.

Figure 18:
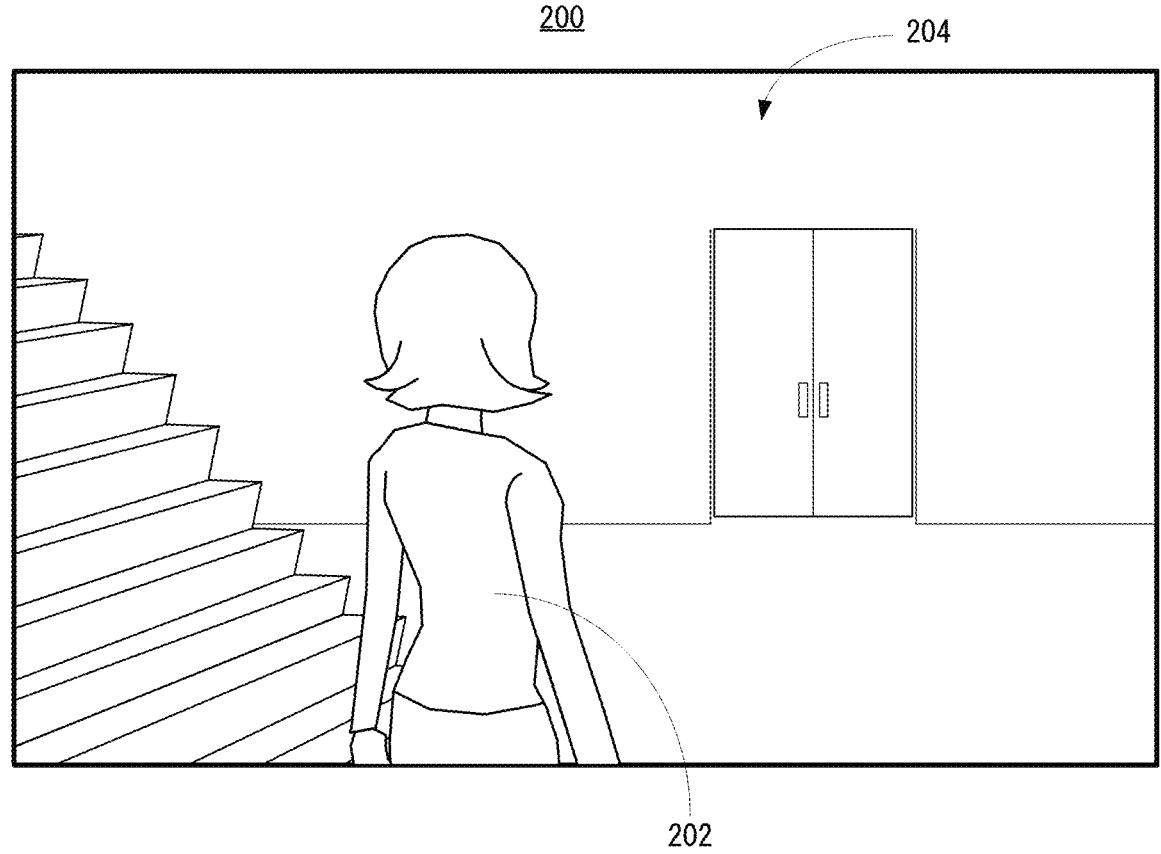
FIG. 18 is a view showing another non-limiting example game screen in the normal mode.

FIG. 18 is a view showing another non-limiting example game screen 200. The game screen 200 shown in FIG. 18 is an example of a case where an angle viewing diagonally the player character 202 is made larger than that of displaying the game screen 200 shown in FIG. 8. Therefore, it is possible to see the player character 202 from diagonally back in the game screen 200 shown in FIG. 18, and therefore, the stairs can be seen from a direction closer to the front than the game screen 200 shown in FIG. 8.

The game mode is changed from the normal mode to the menu mode in a case shown in FIG. 18, the virtual camera 250 is moved around behind the player character 202 so that the direction of the virtual camera 250 becomes the direction of the horizontal component of the direction of the player character 202, and then moved to a position that becomes the positional relationship in the menu mode.

Figure 19:
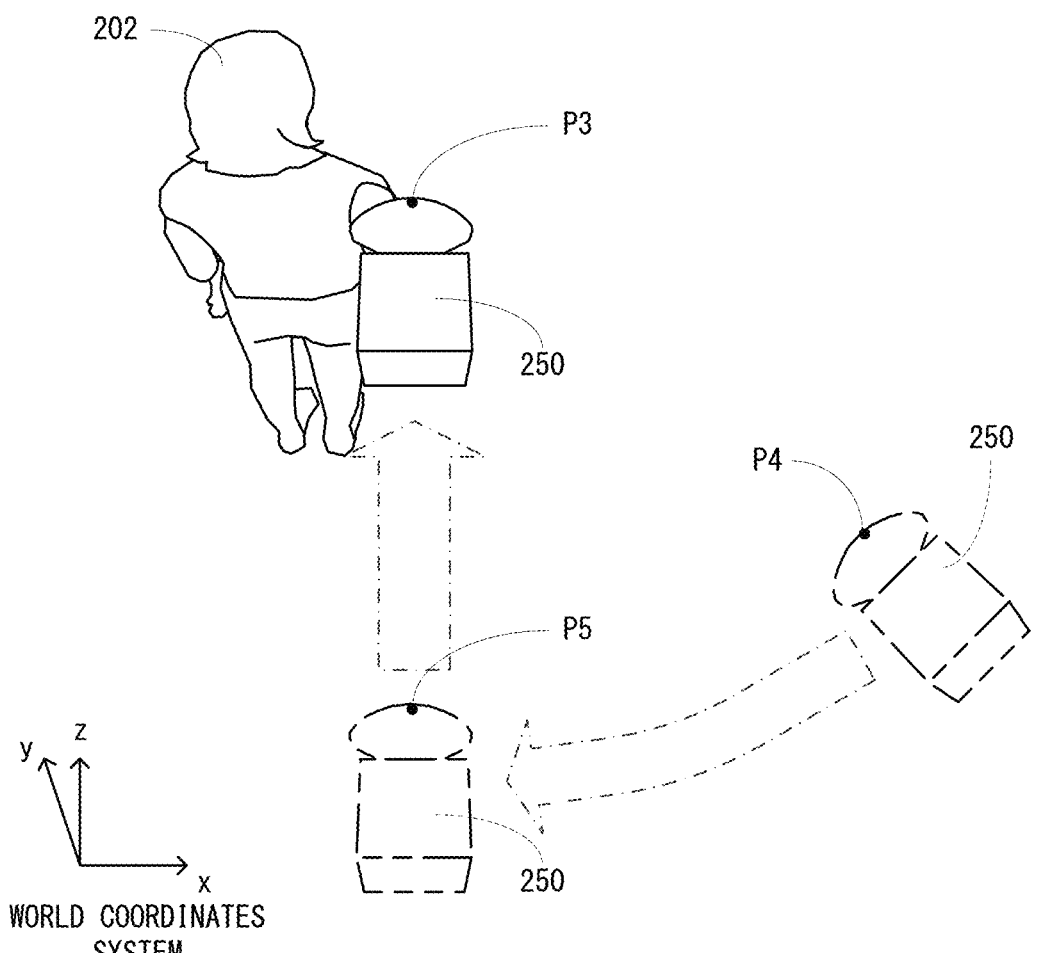
FIG. 19 is a view showing another non-limiting example positional relationship between the player character and the virtual camera when changing from the normal mode to the menu mode viewed diagonally above the virtual space.

FIG. 19 is a view showing another non-limiting example movement of the position of the virtual camera 250 in a case where the game mode is changed from the normal mode to the menu mode viewed from diagonally above the virtual space. In an example shown in FIG. 19, in the normal mode, the virtual camera 250 is arranged in another normal mode position P4 and faces the gazing point (see FIG. 12A and FIG. 12B) set to the right side of the head of the player character 202. When the game mode is changed from the normal mode to the menu mode, the virtual camera 250 is moved around up to a position behind the player character 202 (in FIG. 19, position P5) while maintaining the distance R with the gazing point, and then, moved straight ahead (or forward) from the position P5 that has been moved around to the menu mode position P3. The position P5 is a position that is moved from the menu mode position P3 of the virtual camera 250 in the menu mode by the distance R in a direction reverse to a direction of the horizontal component of the direction of the player character 202.

However, this is an example, and the virtual camera 250 may be moved toward the menu mode position P3 while going around.

Figure 20:
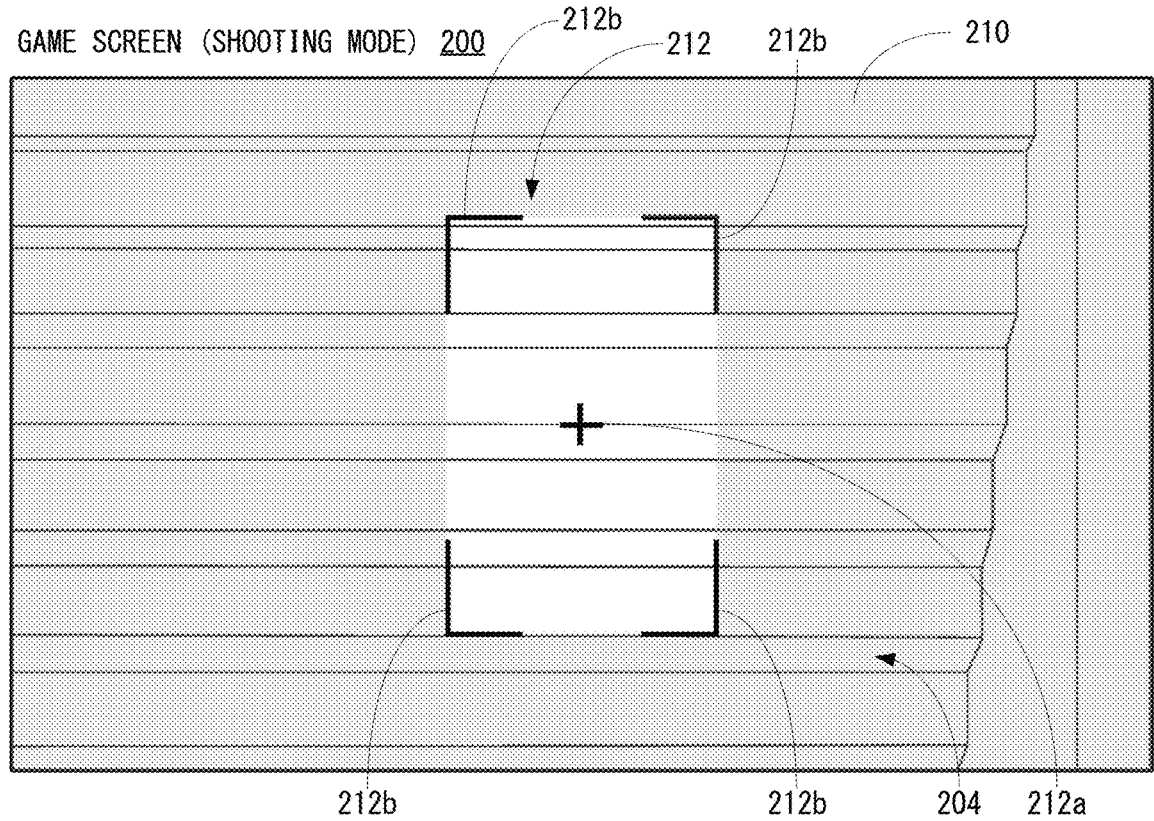
FIG. 20 is a view showing another non-limiting example game screen in the shooting mode.

As described above, if the position of the virtual camera 250 is moved based on a virtual camera operation by the player in the shooting mode, the position of the player character 202 is be moved according to this movement in parallel therewith. FIG. 20 is a view showing another non-limiting example game screen 200 in the shooting mode. The game screen 200 shown in FIG. 20 is displayed on the display 12 in a case where the camera provided in the handheld terminal used by the player character 202 shoots the stairs displayed on the game screen 200 shown in the FIG. 8 etc. from diagonally front in the virtual space.

Figure 21:
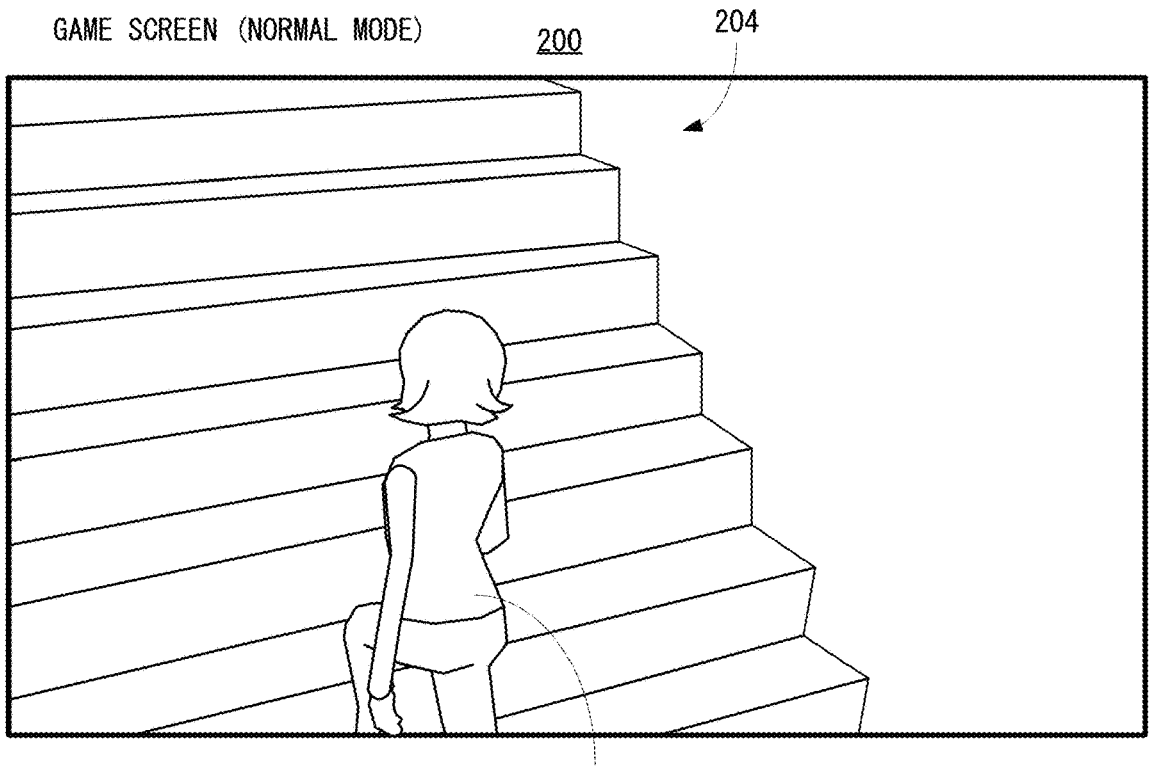
FIG. 21 is a view showing a further non-limiting example game screen in the normal mode.

When the game mode is changed (i.e., returned) from the shooting mode to the normal mode, the virtual camera 250 is set to a position having a positional relationship in the normal mode before changing to the shooting mode with respect to the current position of the player character 202. For example, when the virtual camera 250 shoots the player character 202 from diagonally back as shown in FIG. 18 before changing to the shooting mode, if changing to the normal mode from a state where the game screen 200 shown in FIG. 20 is being displayed, the game screen 200 as shown in FIG. 21 is displayed. However, the current position of the player character 202 is a position of the player character 202 at the time that the shooting mode is ended.

FIG. 21 is a view showing another non-limiting example game screen 200 of the normal mode. When displaying the game screen 200 shown in FIG. 21, the player character 202 is arranged in a position and direction of the virtual camera 250 in a case of displaying the game screen 200 shown in FIG. 20. Moreover, the virtual camera 250 is arranged with the normal mode position and direction having a positional relationship in the normal mode immediately before changing to the shooting mode with respect to the position of the player character 202 arranged as described above.

In this embodiment, the normal mode position P1 and direction of the virtual camera 250 in the normal mode immediately before changing to the shooting mode or the menu mode are stored, and when changing (returning) from the shooting mode or the menu mode to the normal mode, the virtual camera 250 is arranged at the normal mode position P1 being stored (or updated), in the direction being stored. However, the normal mode position P1 of the virtual camera 250 is moved in parallel with the position of the player character 202 in the shooting mode, i.e., updated. Moreover, as described above, in the shooting mode, the position of the player character 202 is moved in parallel with the shooting mode position P2 of the virtual camera 250.

Moreover, although illustration is omitted, when the game mode is changed from the shooting mode to the menu mode, the virtual camera 250 is arranged at the menu mode position P3 having the positional relationship shown in FIG. 14A and FIG. 14B based on the current position of the player character 202. However, the current position of the player character 202 is a position of the player character 202 in the shooting mode immediately before changing to the menu mode. Moreover, the current position of the player character 202 may be set to the position of the player character 202 at the time of ending the shooting mode.

FIG. 22 is a view showing a non-limiting example memory map 850 of the DRAM 85 shown in FIG. 6. As shown in FIG. 22, the DRAM 85 includes a program storage area 852 and a data storage area 854. The program storage area 852 is stored with a program of game application (i.e., game program). As shown in FIG. 22, the game program includes a main processing program 852*a*, an image generation program 852*b*, an operation detection program 852*c*, a game control program 852*d*, a virtual camera control program 852*e*, an image display program 852*f*, etc. However, a function of displaying images such as a game image is a function that the main body apparatus 2 is provided with. Therefore, the image display program 852*f* is not included in the game program.

Although a detailed description is omitted, at a proper timing after a power of the main body apparatus 2 is turned on, a part or all of each of the programs 852*a*-852*f* is read from the flash memory 84 and/or a storage medium attached to the slot 23 to be stored in the DRAM 85. However, a part or all of each of the programs 852*a*-852*f* may be acquired from other computers capable of performing communication with the main body apparatus 2.

The main processing program 852*a* is a program for executing overall game processing (hereinafter, referred to as "overall processing") of a virtual game of the embodiment.

The image generation program 852*b* is a program for generating, using image generation data 854*b* described later, display image data corresponding to various kinds of images such as a game image.

The operation detection program 852*c* is a program for acquiring the operation data 854*a* from the left controller 3 and/or the right controller 4.

The game control program 852*d* is a program for executing game control processing of the virtual game. The game control processing includes processing that makes the player character 202 perform an arbitrary action or operation according to an operation of the player, processing that makes the non-player character perform an arbitrary action or operation without regarding to an operation of the player.

However, in the game control processing, there is a case of changing the position and the direction of the player character 202 according to an advance of the virtual game regardless of an operation of the player.

The virtual camera control program 852*e* is a program for changing the position and the direction of the virtual camera 250 according to an operation of the player (i.e., virtual camera operation) or according to the advance of the virtual game without regarding to an operation of the player.

The image display program 852*f* is a program for outputting to a display the display image data generated according to the image generation program 852*b*. Therefore, images corresponding to the display image data (game screen 200, etc.) are displayed on the display such as the display 12.

In addition, the program storage area 852 is further stored with a sound output program for outputting a sound such as a BGM, a communication program for performing communication with other apparatuses, a backup program for storing data in a nonvolatile storage medium such as the flash memory 84, etc.

Moreover, the data storage area 854 is stored with the operation data 854*a*, the image generation data 854*b*, player character data 854*c*, game mode data 854*d*, normal mode virtual camera data 854*e*, shooting mode virtual camera data 854*f*, menu mode virtual camera data 854*g*, album data 854*h*, etc. Moreover, a movement flag 854*i* is provided in the data storage area 854.

The operation data 854*a* is operation data received from the left controller 3 and/or the right controller 4. In the embodiment, when the main body apparatus 2 receives the operation data from both of the left controller 3 and the right controller 4, the main body apparatus 2 stores the operation data 854*a* while making the left controller 3 and the right controller 4 be identifiable. Moreover, when one or more further controllers are used, the main body apparatus 2 stores the operation data 854*a* while making the one or more further controllers identifiable.

The image generation data 854*d* is data required for generating the display image data, such as polygon data and texture data.

The player character data 854*c* includes current position data, direction data and item data of the player character 202. The current position data includes data of a current position of the player character 202 in the virtual space, i.e., data of the three-dimensional coordinates. The direction data includes data of a current direction of the player character 202 in the virtual space. The item data includes a kind of item and data of the number of items that the player character 202 possesses.

The game mode data 854*d* is data for determining whether the game mode is any one of the normal mode, the menu mode and the shooting mode, and stored with the current game mode and the last (immediately before) game mode identifiably.

The normal mode virtual camera data 854*e* includes position data and direction data of the virtual camera 250 in the normal mode, and position data of the gazing point in the normal mode. The position data of the virtual camera 250 in the normal mode is data of the normal mode position P1 of the virtual camera 250 in the virtual space in the normal mode, i.e., three-dimensional coordinate data. The direction data of the virtual camera 250 in the normal mode is data of the direction of the virtual camera 250 in the virtual space in the normal mode.

The shooting mode virtual camera data 854*f* includes position data and direction data of the virtual camera 250 in the shooting mode, and position data of the gazing point in the shooting mode. The position data of the virtual camera 250 in the shooting mode is data of the shooting mode position P2 of the virtual camera 250 in the virtual space in the shooting mode, i.e., three-dimensional coordinate data. The direction data of the virtual camera 250 in the shooting mode is data of the direction of the virtual camera 250 in the virtual space in the shooting mode.

The menu mode virtual camera data 854g includes position data and direction data of the virtual camera 250 in the menu mode, and position data of the gazing point in the menu mode. The position data of the virtual camera 250 in the menu mode is data of the menu mode position P3 of the virtual camera 250 in the virtual space in the shooting mode, i.e., three-dimensional coordinate data. The direction data of the virtual camera 250 in the menu mode is data of the direction of the virtual camera 250 in the virtual space in the menu mode.

The album data 854h is image data of one or more shot images shot in the shooting mode.

The movement flag 854i is a flag for determining whether the virtual camera 250 is being moved when the game mode is to be changed. When the virtual camera 250 is being moved, the movement flag 854i is turned on. On the other hand, when the virtual camera 250 is not being moved, the movement flag 854i is turned off.

Although illustration is omitted, the data storage area 854 is stored with other data such as data of the non-player object(s) and the background object(s) that are arranged in the virtual space and data of the obtained memorandum, and is provided with flag(s) and timer(s) (or counter(s)).

Figure 23:
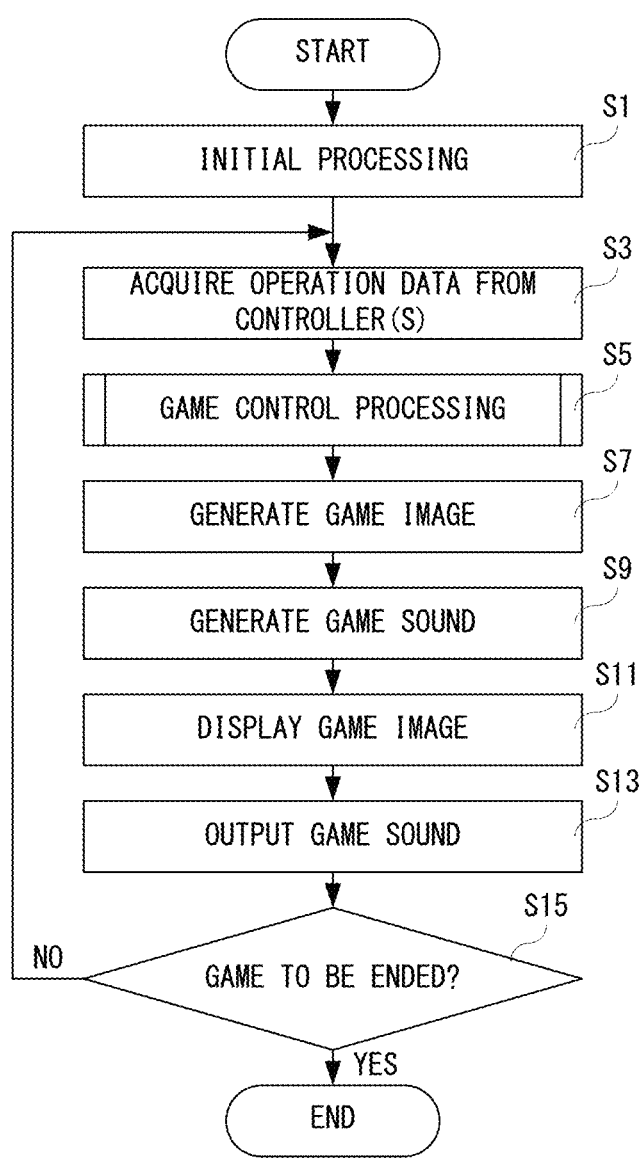
FIG. 23 is a flowchart showing non-limiting example overall processing of a processor(s) of the main body apparatus shown in FIG. 6.
Figure 24:
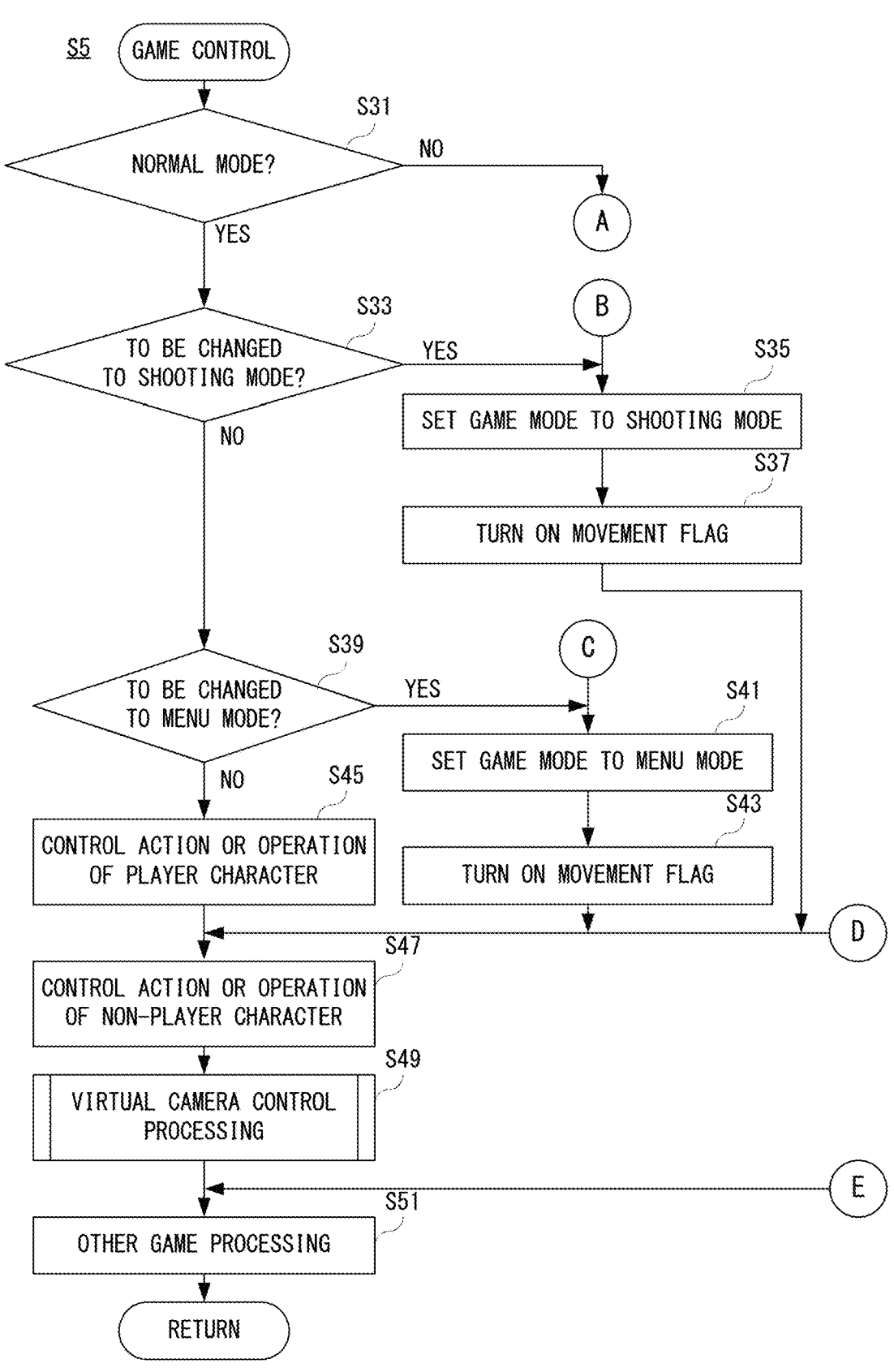
FIG. 24 is a flowchart showing a first part of non-limiting example game control processing of the processor(s) of the main body apparatus shown in FIG. 6.
Figure 25:
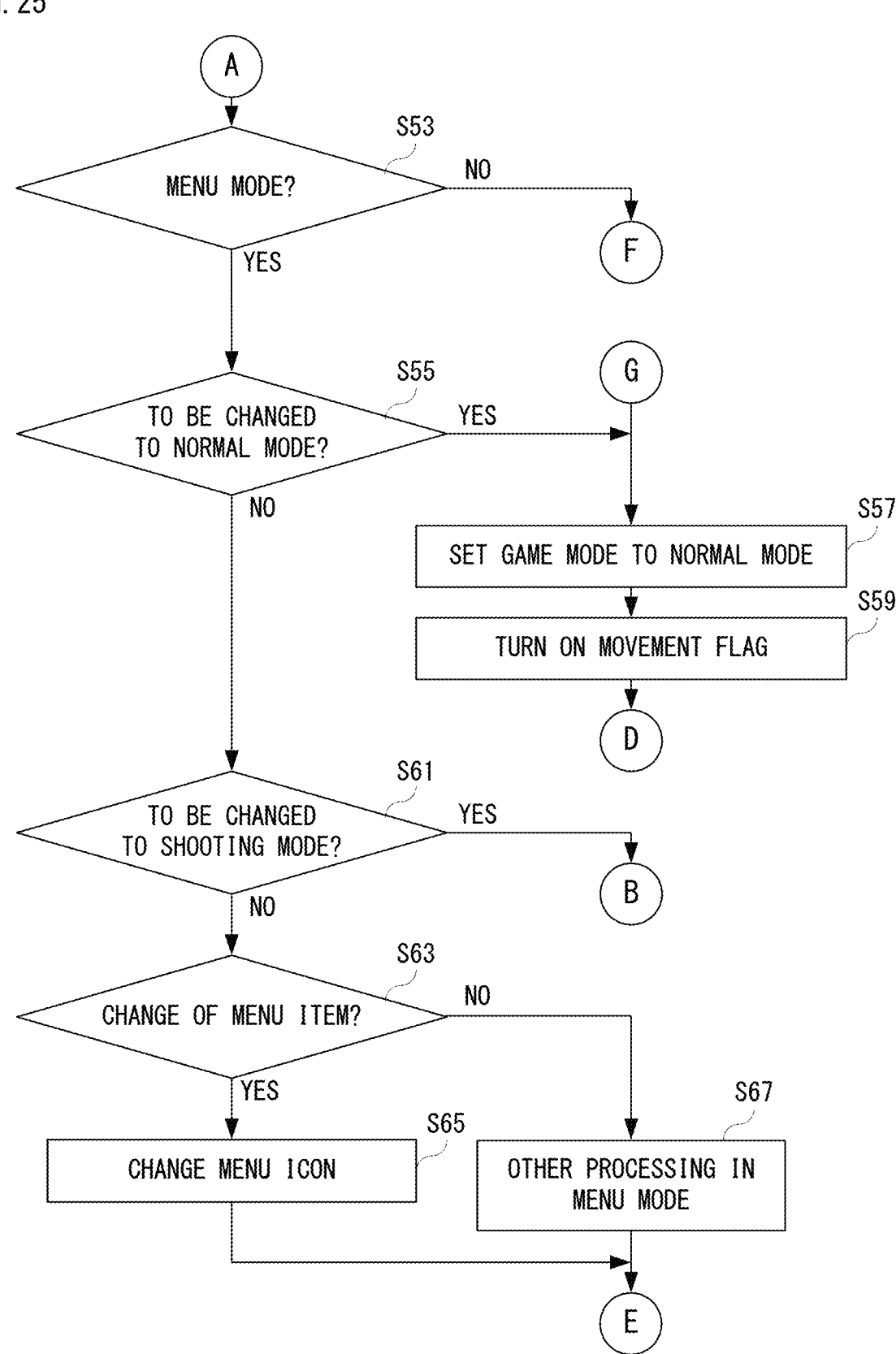
FIG. 25 is a flowchart showing a second part of the non-limiting example game control processing of the processor(s) of the main body apparatus shown in FIG. 6, following FIG. 24.
Figure 26:
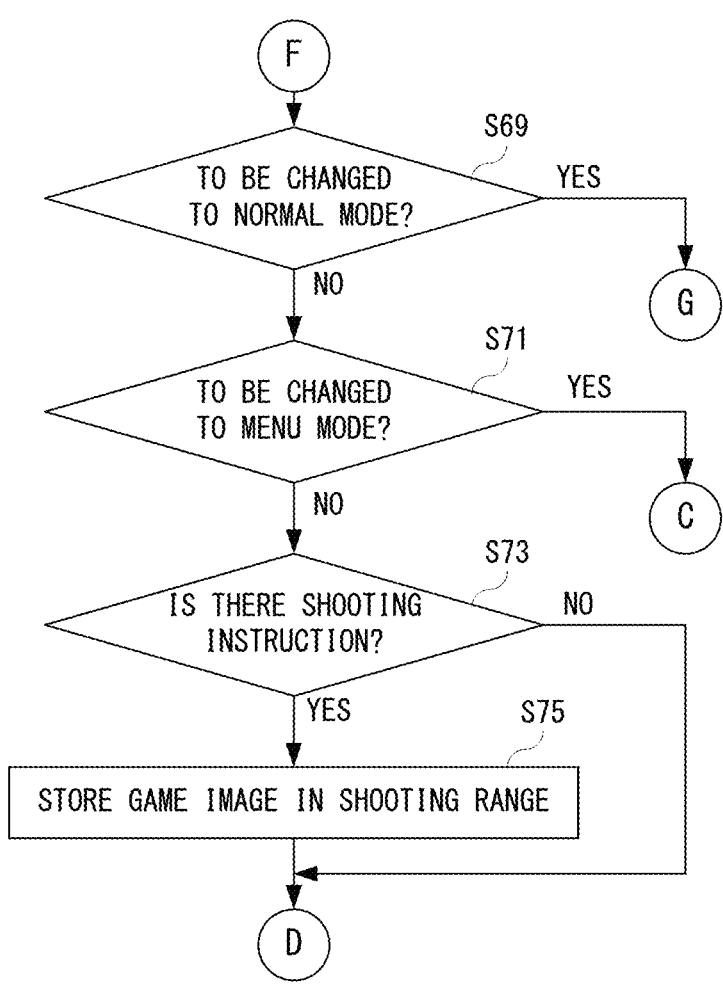
FIG. 26 is a flowchart showing a third part of the non-limiting example game control processing of the processor(s) of the main body apparatus shown in FIG. 6, following FIG. 25.

FIG. 23 is a flowchart showing non-limiting example processing (overall processing) of the game program by the processor 81 (or computer) of the main body apparatus 2. FIG. 24-FIG. 26 are flowcharts showing non-limiting example game control processing of the processor 81 of the main body apparatus 2. FIG. 27-FIG. 30 are flowcharts showing non-limiting example virtual camera control processing of the processor 81 of the main body apparatus 2. In the following, the overall processing, the game control processing and the virtual camera control processing will be described using FIG. 23-FIG. 30.

However, processing of respective steps of the flowcharts shown in FIG. 23-FIG. 30 are mere examples, and if the same or similar result is obtainable, an order of the respective steps may be exchanged. Moreover, in the embodiment, it will be described that the processing of the respective steps of the flowcharts shown in FIG. 23-FIG. 30 are basically executed by the processor 81; however, some steps may be executed by a processor(s) and/or a dedicated circuit(s) other than the processor 81.

When the power of the main body apparatus 2 is turned on, prior to execution of the overall processing, the processor 81 executes a boot program stored in a boot ROM not shown, whereby respective units including the DRAM 85, etc. are initialized. When the execution of the game program of the embodiment is instructed by the player, the processor 81 of the main body apparatus 2 will start the overall processing.

As shown in FIG. 23, if the overall processing is started, the processor 81 executes initial setting in a step S1. Here, the processor 81 arranges the player character 202, the non-player character and the background object 204 in respective initial positions in the virtual space. However, in starting the game from where the player left off, the player character 202, the non-player character and the background object 204 are arranged in positions at the time of being saved. At this time, the data of the initial position or the position at the time of being saved of the player character 202 is stored as the data of the current position of the player character data 854c in the data storage area 854. Moreover, here, the game mode data 854d that indicating that the game mode is set to the normal mode and the current game mode is the normal mode is stored in the data storage area 854. Since the immediately preceding game mode is not set at the time of game start, here, the game mode data 854d indicates that the immediately preceding game mode is neither game mode.

In a subsequent step S3, the operation data transmitted from the left controller 3 and/or the right controller 4 is acquired, and in a step S5, the game control processing described later is executed (see FIG. 24-FIG. 26).

In a next step S7, the game image is generated. Here, the processor 81 generates the game image data corresponding to the game images (game screen 200, etc.) based on a result of the game control processing in the step S5. Moreover, the game sound is generated in a step S9. Here, the processor 81 generates the sound data corresponding to the game sound according to the result of the game control processing of the step S5.

Subsequently, the game image is displayed in a step S11. Here, the processor 81 outputs the game image data generated in the step S7 to the display 12. Moreover, the game sound is output in a step S13. Here, the processor 81 outputs the game sound data generated in the step S9 to the speaker 88 through the codec circuit 87.

Then, in a step S15, it is determined whether the game is to be ended. The determination in the step S15 is performed based on whether the player issues an instruction to end the game.

If "NO" is determined in the step S15, that is, if the game is not to be ended, the process returns to the step S3. On the other hand, if "YES" is determined in the step S15, that is, if the game is to be ended, the overall game processing is terminated.

As shown in FIG. 24, if the game control processing shown in the step S5 is started, the processor 81 determines, in a step S31, whether the current game mode is the normal mode with reference to the game mode data 854d. If it is determined "NO" in the step S31, that is, if the current game mode is not the normal mode, the process proceeds to a step S53 shown in FIG. 25.

On the other hand, if it is determined "YES" in the step S31, that is, if the current game mode is the normal mode, it is determined, in a step S33, whether the game mode is to be changed from the normal mode to the shooting mode. In this step S33, the processor 81 determines whether the operation data acquired in the step S3 is the operation data of the ZL button 39. Hereinafter, this is also the same for cases of determining whether each of the button 103 and 113 and the sticks 32 and 52 is operated.

If it is determined "YES" in the step S33, that is, if it is determines that the game mode is to be changed from the normal mode to the shooting mode, the game mode is set to the shooting mode in a step S35, the movement flag 854i is turned on in a step S37, and then, the process proceeds to a step S47. In the step S35, the processor 81 stores (or overwrites) the game mode data 854d that the current game mode is set the shooting mode and the last game mode is set as the normal mode in the data storage area 854. Moreover, when processing of the step S35 is executed, the processor 81 calculates the position of the virtual camera 250 after movement (i.e., shooting mode position P2) and the position of the gazing point after movement so that the positional relationship as shown in FIG. 13A and FIG. 13B is obtainable, and updates the shooting mode virtual camera data 854*f*.

On the other hand, if it is determined "NO" in the step S33, that is, if it is determined that the game mode is not to be changed from the normal mode to the shooting mode, it is determined, in a step S39, whether the game mode is to be changed from the normal mode to the menu mode. In this step S39, the processor 81 determines whether the operation data acquired in the step S3 is the operation data of the X button 55.

If it is determined "YES" in the step S39, that is, if it is determined that the game mode is to be changed from the normal mode to the menu mode, the current game mode is set as the menu mode in a step S41, and the movement flag 854*i* is turned on, and then, the process proceeds to the step S47. In the step S41, the processor 81 stores (or overwrites) the game mode data 854*d* that the current game mode is set as the menu mode and the last game mode is set as the normal mode to the data storage area 854. Moreover, when processing of the step S41 is executed, the processor 81 calculates the position of the virtual camera 250 after movement (i.e., menu mode position P3) and the position of the gazing point after movement so that the positional relationship as shown in FIG. 14A and FIG. 14B is obtainable, and updates the menu mode virtual camera data 854*g*.

On the other hand, if it is determined "NO" in the step S39, that is, if it is determined that the game mode is not to be changed from the normal mode to the menu mode, an action or operation of the player character 202 is controlled in a step S45. When the position and/or the direction of the player character 202 are to be changed in the step S45, the position data and/or the direction data are updated included in the player character data 854*c*. However, when the player does not perform an operation on the action or operation of the player character 202, processing of the step S45 may be skipped. Moreover, there is an occasion that the position and the direction of the player character 202 are forcibly updated by the processor 81 regardless of an operation of the player. Furthermore, in the step S45, the player character 202 is made to inspect the background object 204, perform an action or operation with respect to the background object 204, acquire an item, solve a mystery, solve a puzzle or talk with a non-player character.

An action or operation of the non-player character is controlled in the subsequent step S47, and in a step S49, virtual camera control processing (see FIG. 27-FIG. 30) described later is executed. However, when not controlling an action or operation of the non-player character, the processor 81 skips processing of the step S47.

Then, in a step S51, other game processing is executed, and the game control processing is ended, and then, the process returns to the overall game processing shown in FIG. 22. In the step S51, processing other than an action or operation of the player character 202 and an action or operation of the non-player character, game clear processing, save processing of the game data, etc. are executed.

As shown in FIG. 25, in the step S53, it is determined whether the current game mode is the menu mode with reference to the game mode data 854*d*. If it is determined "NO" in the step S53, that is, if the current game mode is not the menu mode but the shooting mode, the process proceeds to a step S69 shown in FIG. 26. On the other hand, if it is determined "YES" in the step S53, that is, if the current game mode is the menu mode, it is determined, in a step S55, whether the game mode is to be changed from the menu mode to the normal mode. In this step S55, the processor 81 determines whether the operation data acquired in the step S3 is the operation data of the B button 54 or the X button 55.

If it is determined "YES" in the step S55, that is, if it is determined that the game mode is to be changed from the menu mode to the normal mode, the current game mode is set as the normal mode in a step S57, and the movement flag 854*i* is turned on in a step S59, and then, the process proceeds to the step S47 shown in FIG. 24. In the step S57, the processor 81 stores (or overwrites) the game mode data 854*d* that the current game mode is set as the normal mode and the last game mode is set as the menu mode to the data storage area 854. Moreover, when processing of the step S57 is executed, the processor 81 calculates the position of the virtual camera 250 after movement (i.e., normal mode position P1) and the position of the gazing point after movement so that the positional relationship as shown in FIG. 12A and FIG. 12B is obtainable, and updates the normal mode virtual camera data 854*e*.

On the other hand, if it is determined "NO" in the step S55, that is, if it is determined that the game mode is not to be changed from the menu mode to the normal mode, it is determined, in a step S61 whether the game mode is to be changed from the menu mode to the shooting mode. In this step S61, the processor 81 determines whether the A button 53 is operated in a state there the menu icon 222 of the shooting mode is being selectable. Whether the A button is operated is determined by whether the operation data acquired in the step S3 is the operation data of the A button 53.

If it is determined "YES" in the step S61, that is, if it is determined that the game mode is to be changed from the menu mode to the shooting mode, the process proceeds to the step S35 shown in FIG. 24. On the other hand, if it is determined "NO" in the step S61, that is, if it is determined that the game mode is not to be changed from the menu mode to the shooting mode, it is determined, in a step S63, whether it is a change of a menu item.

If it is determined "YES" in the step S63, that is, if it is a change of the menu item, the menu icons 220, 222 and 224 being selectable are changed according to an operation of the player, and the process proceeds to the step S51 shown in FIG. 24. In the step S65, the processor 81 moves the menu icons 220, 222 and 224 to the left or right by one centering on the position of the player character 202.

On the other hand, if it is determined "NO" in the step S63, that is, if it is not a change of the menu item, processing of others in the menu mode is executed, and the process proceeds to the step S51. In the step S67, the album function or the memorandum function is selected, or the album function or the memorandum function is executed. When the album function is executed, it is possible to review the images corresponding to the image data of the album data 854*h*. However, when the player is operating nothing, the processing in the step S67 is skipped.

As shown in FIG. 26, in a step S69, it is determined whether the game mode is to be changed from the shooting mode to the normal mode. In this steppe S69, the processor 81 determines, with reference to the game mode data 854*d*, whether the operation data acquired in the step S3 is the operation data of the B button 54 when the game mode immediately before the shooting mode is the normal mode. Moreover, when the game mode immediately before the shooting mode is the menu mode, it is determined whether the operation data acquired in the step S3 is the operation data of the X button 55.

If it is determined "YES" in the step S69, that is, if it is determined that the game mode is to be changed from the shooting mode to the normal mode, the process proceeds to the step S57 shown in FIG. 25. On the other hand, if it is determined "NO" in the step S69, that is, if it is not determined that the game mode is to be changed from the shooting mode to the normal mode, it is determined, in a step S71, whether the game mode is to be changed from the shooting mode to the menu mode. In this steppe S71, the processor 81 determines whether the operation data acquired in the step S3 is the operation data of the B button 54.

If it is determined "YES" in the step S71, that is, if it is determined that the game mode is to be changed from the shooting mode to the menu mode, the process proceeds to the step S41 shown in FIG. 24. On the other hand, if it is determined "NO" in the step S71, that is, if it is determined that the game mode is not to be changed from the shooting mode to the menu mode, it is determined, in a step S73, whether there is a shooting instruction. In the step S73, the processor 81 determines whether the operation data acquired in the step S3 is the operation data of the A button 53.

If it is determined "NO" in the step S73, that is, if there is no shooting instruction, the process proceeds to the step S51 shown in FIG. 24. On the other hand, if it is determined "YES" in the step S73, that is, if there is a shooting instruction, a game image of the shooting range is stored in a step S75, and the process proceeds to the step S51. In this step S75, the processor 81 stores (or adds) the image data of the game image of the shooting range as the album data 854h.

Figure 27:
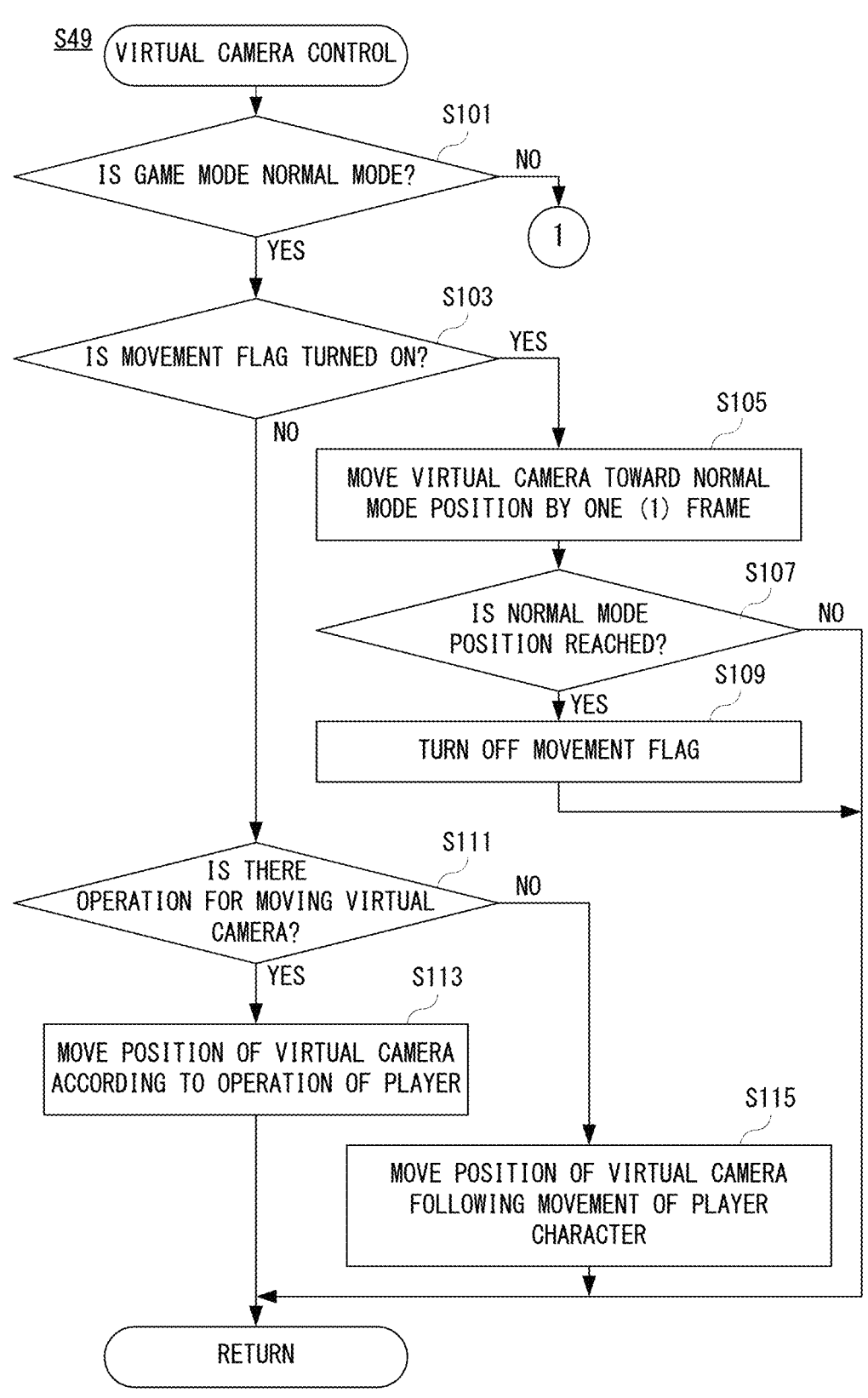
FIG. 27 is a flowchart showing a first part of non-limiting example virtual camera control processing of the processor(s) of the main body apparatus shown in FIG. 6.

As shown in FIG. 27, if the virtual camera control processing is started, the processor 81 determines, in a step S101, whether the game mode is the normal mode. If it is determined "NO" in the step S101, that is, if the game mode is not the normal mode, the process proceeds to a step S117 shown in FIG. 28.

On the other hand, if it is determined "YES" in the step S101, that is, if the game mode is the normal mode, it is determined, in a step S103, whether the movement flag 854i is turned on. If it is determined "YES" in the step S103, that is, if the movement flag 854i is turned on, in a step S105, the position of the virtual camera 250 is moved by one frame toward the normal mode position P1 with reference to the normal mode virtual camera data 854e. Although illustration is omitted, at this time, the processor 81 moves the position of the gazing point by one frame toward the position in the normal mode (see FIG. 12A and FIG. 12B) with reference to the normal mode virtual camera data 854e. However, the frame is a unit time of the updating of a screen, and is $1/30$ seconds, $1/60$ seconds or $1/120$ seconds. Moreover, a movement amount of the virtual camera 250 in the one frame is determined in advance. Moreover, the direction of the virtual camera 250 is also changed so as to face the gazing point after movement.

In a subsequent step S107, it is determined, with reference to the normal mode virtual camera data 854e, whether position of the virtual camera 250 reaches the normal mode position P1. If it is determined "YES" in the step S107, that is, if the position of the virtual camera 250 reaches the normal mode position P1, the movement flag 854i is turned off in a step S109, and the virtual camera control processing is ended, and then, the process returns to the game control processing shown in FIG. 24-FIG. 26. On the other hand, if it is determined "NO" in the step S107, that is, if the position of the virtual camera 250 has not reached the normal mode position P1, the virtual camera control processing is ended, and the process returns to the game control processing.

Moreover, if it is determined "NO" in the step S103, that is, if the movement flag 854i is turned off, it is determined, in a step 111, whether there is a moving operation of the virtual camera 250. If it is determined "YES" in the step S111, that is, if there is a moving operation of the virtual camera 250, the position of the virtual camera 250 is moved according to an operation of the player in a step S113, and the virtual camera control processing is ended, and then, the process returns to the game control processing. However, in the step S113, the direction of the virtual camera 250 is changed so as to face the gazing point, and the distance R between the gazing point and the virtual camera 250 is maintained constant.

On the other hand, if it is determined "NO" in the step S111, that is, if there is no moving operation of the virtual camera 250, the position of the virtual camera 250 is moved according to the movement of the player character 202 in a step S115, and the virtual camera control processing is ended, and then, the process returns to the game control processing. That is, in the step S115, the virtual camera 250 follows the player character 202. However, when the player character 202 is not being moved, the processing of the step S115 is skipped.

Figure 28:
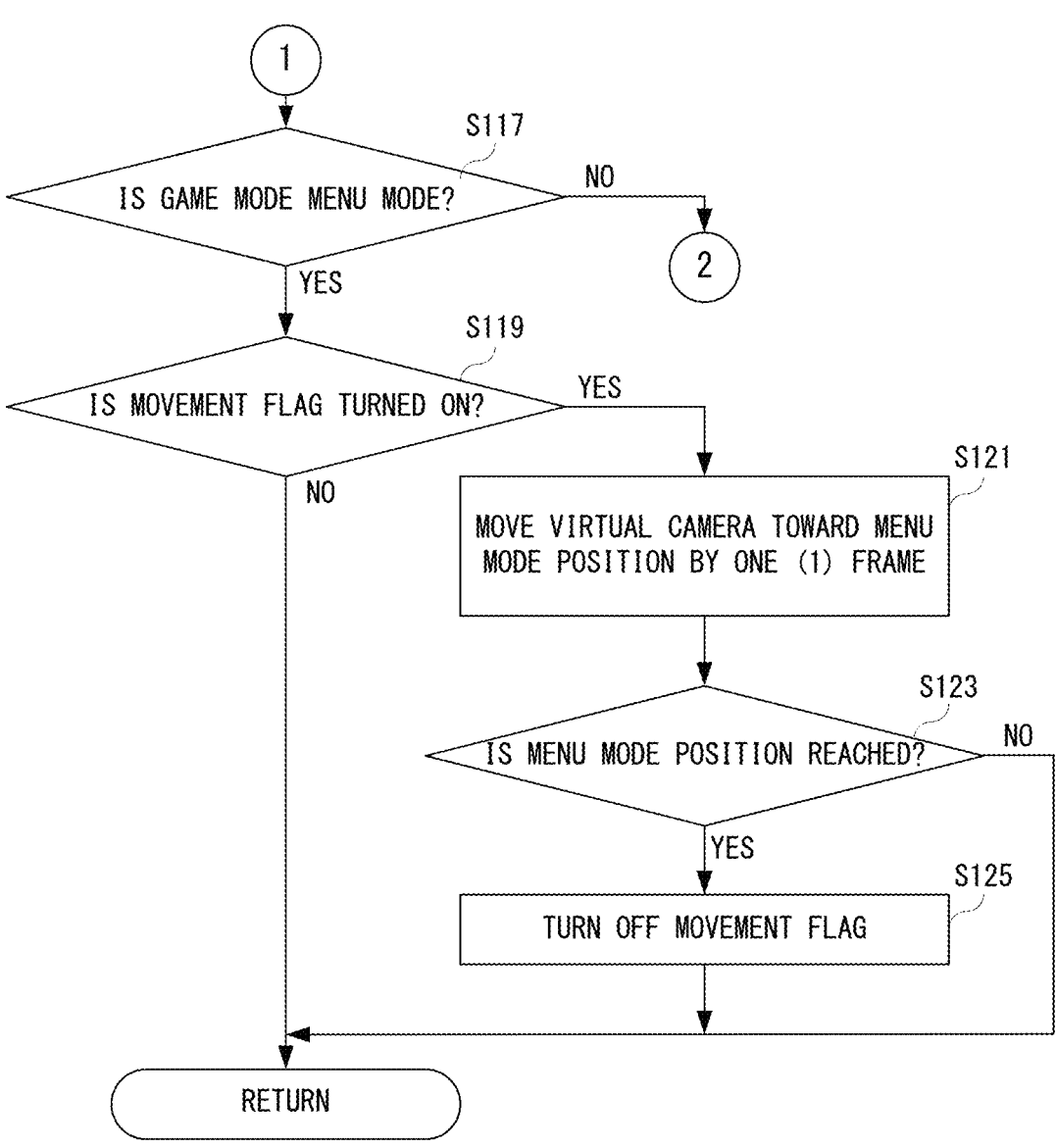
FIG. 28 is a flowchart showing a second part of the non-limiting example virtual camera control processing of the processor(s) of the main body apparatus shown in FIG. 6, following FIG. 27.

As shown in FIG. 28, in the step S117, it is determined whether the game mode is the menu mode. If it is determined "NO" in the step S117, that is, if the game mode is not the menu mode but the shooting mode, the process proceeds to a step S127 shown in FIG. 29. On the other hand, if it is determined "YES" in the step S117, that is, if the game mode is the menu mode, it is determined, in a step S119, whether the movement flag 854i is turned on.

If it is determined "NO" in the step S119, the virtual camera control processing is ended and the process returns to the game control processing. On the other hand, if it is determined "YES" in the step S119, in a step S121, the position of the virtual camera 250 is moved by one frame toward the menu mode position P3 with reference to the menu mode virtual camera data 854g. Although illustration is omitted, at this time, the processor 81 moves the position of the gazing point by one frame toward the position in the menu mode (see FIG. 14A and FIG. 14B) with reference to the menu mode virtual camera data 854g.

In a subsequent step S123, it is determined, with reference to the menu mode virtual camera data 854e, whether the position of the virtual camera 250 reaches the menu mode position P3. If it is determined "YES" in the step S123, that is, if the position of the virtual camera 250 reaches the menu mode position P3, the movement flag 854i is turned off in a step S125, and the virtual camera control processing is ended, and then, the process returns to the game control processing. On the other hand, if it is determined "NO" in the step S123, that is, if the position of the virtual camera 250 has not reached the menu mode position P3, the virtual camera control processing is ended, and the process returns to the game control processing.

Figure 29:
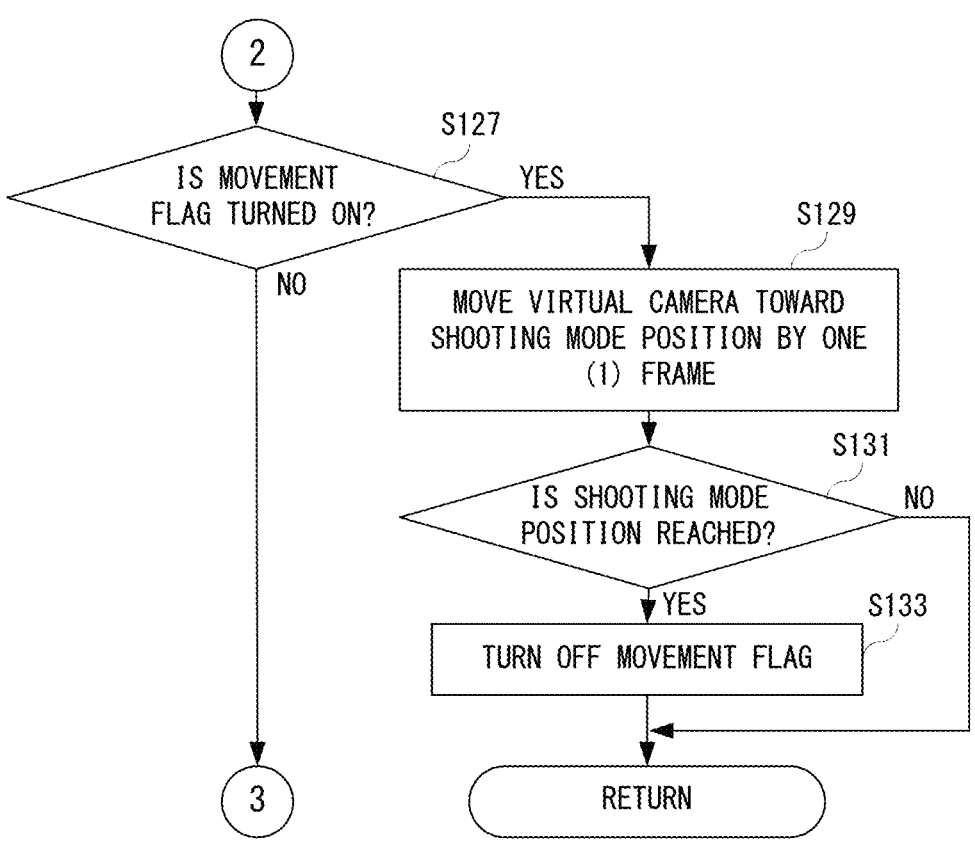
FIG. 29 is a flowchart showing a third part of the non-limiting example virtual camera control processing of the processor(s) of the main body apparatus shown in FIG. 6, following FIG. 28.

As described above, when the game mode is the shooting mode, it is determined whether the movement flag 854i is turned on in the step S127 shown in FIG. 29. If it is determined "NO" in the step S127, the process proceeds to a step S135 shown in FIG. 30. On the other hand, if it is determined "YES" in the step S127, in a step S129, with reference to the shooting mode virtual camera data 854f, the virtual camera 250 is moved toward the shooting mode position P2 by one frame. Although illustration is omitted, at this time, the processor 81 moves the position of the gazing point by one frame toward the position in the shooting mode (see FIG. 13A and FIG. 13B) with reference to the shooting mode virtual camera data 854f.

In a subsequent step S131, it is determined, with reference to the shooting mode virtual camera data 854f, whether the position of the virtual camera 250 reaches the shooting mode position P2. If it is determined "YES" in the step S131, that is, if the position of the virtual camera 250 reaches the shooting mode position P2, the movement flag 854i is turned off in a step S133, and the virtual camera control processing is ended, and then, the process returns to the game control processing. On the other hand, if it is determined "NO" in the step S131, that is, if the position of the virtual camera 250 has not reached the shooting mode position P2, the virtual camera control processing is ended, and the process returns to the game control processing.

Figure 30:
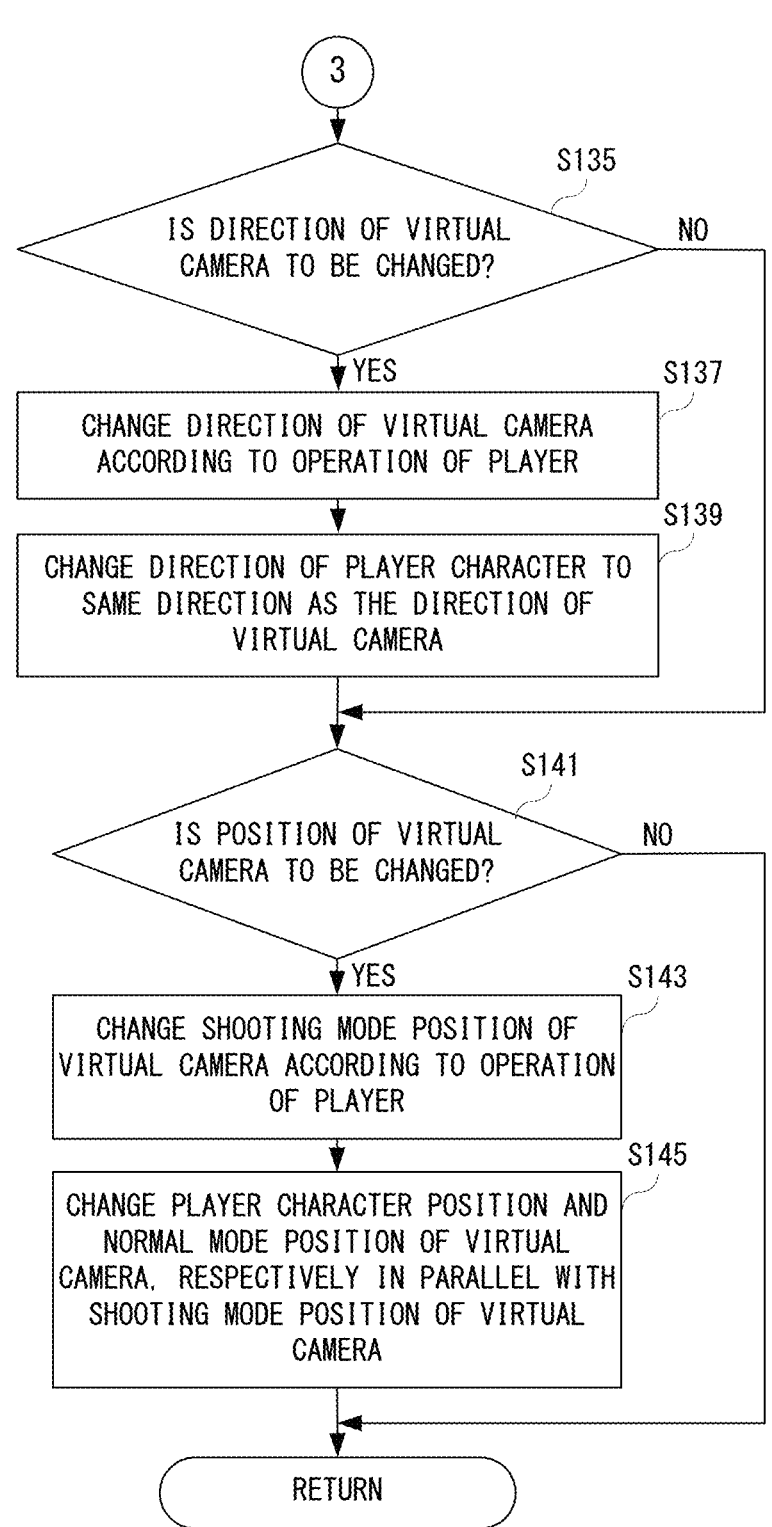
FIG. 30 is a flowchart showing a fourth part of the non-limiting example virtual camera control processing of the processor(s) of the main body apparatus shown in FIG. 6, following FIG. 29.

As shown in FIG. 30, it is determined, in the step S135, whether it is a change of the direction of the handheld terminal that the player character 202 uses, i.e., the virtual camera 250. Here, the processor 81 determines whether a tilting operation of the analog stick 52 is performed. If it is determined "NO" in the step S135, that is, if it is not a change of the direction of the virtual camera 250, the process proceeds to a step S141.

On the other hand, if it is determined "YES" in the step S135, that is, if it is a change of the direction of the virtual camera 250, the direction of the virtual camera 250 is changed according to an operation of the player in a step S137. Specifically, the gazing point is moved according to an operation of the player on the sphere having a radius of the distance R centering on the position of the virtual camera 250, and the direction of the virtual camera 250 is changed so as to face this gazing point.

In a next step S139, the direction of the player character 202 is changed to the same direction as the direction of the virtual camera 250, and the process proceeds to a step S141.

In the step S141, it is determined whether it is a change of the position of the handheld terminal that the player character 202 uses, i.e., the virtual camera 250. Here, the processor 81 determines whether a tilting operation of the analog stick 32 is performed. If it is determined "NO" in the step S141, that is, if it is not a change of the position of the virtual camera 250, the virtual camera control processing is ended, and the process returns to the game control processing.

On the other hand, if it is determined "YES" in the step S141, that is, if it is a change of the position of the virtual camera 250, the shooting mode position P2 of the virtual camera 250 is changed according to an operation of the player in a step S143. At this time, the gazing point in the shooting mode is also changed in parallel to the shooting mode position P2. Therefore, the shooting mode virtual camera data 854f is updated.

In a next step S145, in parallel to the shooting mode position P2 of the virtual camera 250, the position of the player character 202 and the normal mode position P1 of the virtual camera 250 are changed, respectively, and the virtual camera control processing is ended, and then, the process returns to the game control processing. In the above described step S145, the player character data 854c and the normal mode virtual camera data 854e are updated.

According to this embodiment, since the position and the direction of the virtual camera at the time of starting of the shooting mode differ whether the game mode is changed to the shooting mode after changing to the menu mode or whether the shooting mode is directly changed from the normal mode, it is possible to start the shooting mode by selecting one of a plurality of starting methods that the positions and the directions of the virtual camera at the time of starting of shooting are different from each other. That is, the player can use methods to change to the shooting mode with different positions and different directions of the virtual camera dependent on a situation.

In addition, in the above-described embodiment, when changing from the normal mode or the menu mode to the shooting mode, the virtual camera is advanced in the direction of the horizontal component of the direction of the virtual camera in the normal mode or the direction of the virtual camera in the menu mode, and the virtual camera is moved to be brought close to the player character; however, it does not need to be limited to this. The virtual camera is advanced in the direction of the horizontal component of the direction of the virtual camera in the normal mode or the direction of the virtual camera in the menu mode, and the player character may be moved to be brought close to the line of sight of the virtual camera before movement.

Figure 31:
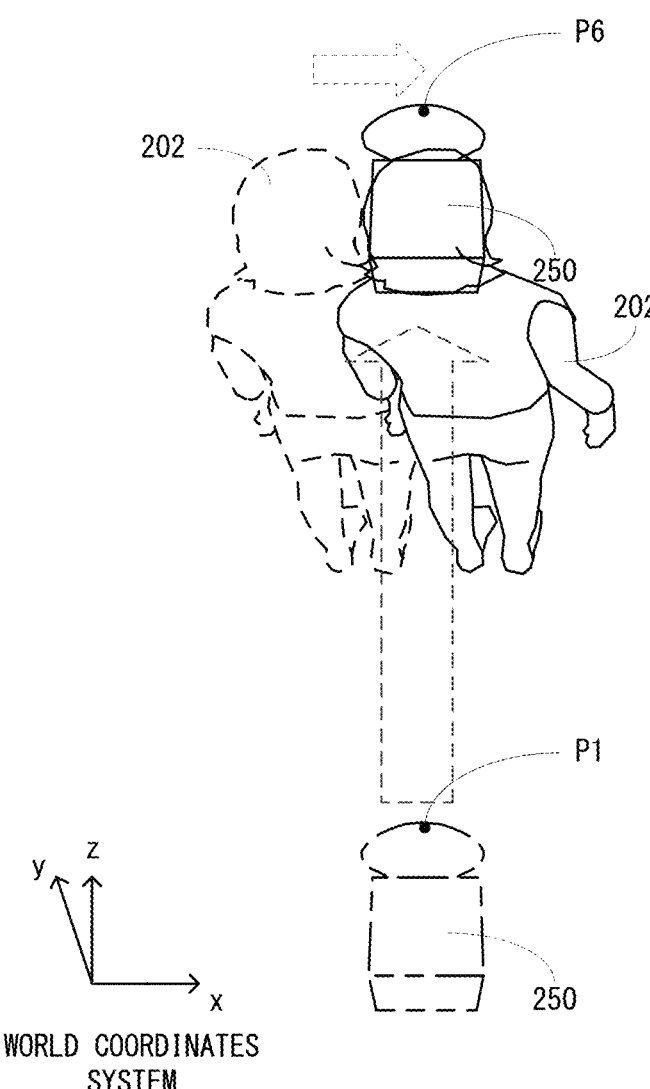
FIG. 31 is a view showing another non-limiting example positional relationship between the player character and the virtual camera when changing from the normal mode to the shooting mode viewed diagonally above the virtual space.

FIG. 31 is a view showing another non-limiting example movement of the position of the virtual camera 250 when the game mode is changed from the normal mode to the shooting mode viewed diagonally above the virtual space. FIG. 31 shows, as an example, a case where the virtual camera 250 is advanced from the normal mode position P1 shown in FIG. 12A and FIG. 12B in the direction of the horizontal component of the direction of the direction of the virtual camera 250 to be moved to the shooting mode position P6 to have the positional relationship as shown in FIG. 13A and FIG. 13B. In FIG. 31, the player character 202 and the virtual camera 250 of a state shown in FIG. 12A and FIG. 12B are indicated by a dotted line, and the player character 202 and the virtual camera 250 of a state after movement of the virtual camera 250 are indicated by a solid line.

However, the shooting mode position P6 is a position that the shooting mode position P2 shown in the above-described embodiment is moved by the distance W1 rightward on the basis of the direction of the virtual camera 250.

When the game mode is changed from the normal mode to the shooting mode, the virtual camera 250 is moved to the direction of the horizontal component of the direction of the virtual camera 250 in the normal mode (direction of the line of sight). The position of the virtual camera 250 after movement, i.e., the shooting mode position P6 is calculated based on the normal mode position P1 and direction of the virtual camera 250 so that the positional relationship as shown in FIG. 13A and FIG. 13B is obtainable. The shooting mode position P6 of the virtual camera 250 is set at a position of the distance D2 ahead the position of the player character 202 in the shooting mode and the height H2 of the eye of the player character. Moreover, the player character 202 is moved so as to intersect, in a horizontal plane, perpendicularly to the horizontal component of the direction of the virtual camera 250. As described above, since the gazing point is set to a position moved to the right side of the position of the player character 202 by the distance W1 in the normal mode, in the shooting mode, the position of the player character 202 is set to the position of the gazing point in the normal mode. Therefore, the shooting mode position P6 of the virtual camera 250 is set at a position that is advanced by the distance D2 from the position of the gazing point in the normal mode in the direction of the horizontal component of the direction of the virtual camera 250 in the normal mode. Therefore, if the game mode is changed from the normal mode to the shooting mode, the virtual camera 250 is advanced toward the shooting mode position P6 from the normal mode position P1.

FIG. 32 is a view showing another non-limiting example movement of the position of the virtual camera when the game mode is changed from the menu mode to the shooting mode viewed diagonally above the virtual space. FIG. 32 shows, as an example, a case where the virtual camera 250 is advanced from the menu mode position P3 shown in FIG. 14A and FIG. 14B to be moved to the shooting mode position P6 to have the positional relationship as shown in FIG. 13A and FIG. 13B. In FIG. 32, the player character 202 and the virtual camera 250 of a state shown in FIG. 14A and FIG. 14B are indicated by a dotted line, and the player character 202 and the virtual camera 250 of a state after movement of the virtual camera 250 are indicated by a solid line.

As described above, when the game mode is changed from the menu mode to shooting mode, the virtual camera 250 is advanced by the predetermined distance (in the above-described embodiment, distance D2 plus (+) distance D3) from the menu mode position P3 toward the direction of the virtual camera 250. Moreover, in this case, as described above, the player character 202 is moved by the distance W2 so that the position of the player character 202 overlaps with a straight line prolonged in a direction of the virtual camera 250 (direction of the line of sight) in the menu mode.

In addition, although the game system 1 is shown as an example of a game system in the above-described embodiment, its configuration should not be limited, and other configurations may be adopted. For example, in the above-described embodiment, the above-described "computer" is a single computer (specifically, the processor 81), but it may be a plurality of computers in other embodiments. The above-described "computer" may be a plurality of computers provided in a plurality of apparatuses, for example, and more specifically, the above-described "computer" may be constituted by the processor 81 of the main body apparatus 2 and the communication control sections (microprocessor) 101 and 111 provided on the controllers.

Moreover, although a case where the game image is displayed on the display 12 is described in the above-described embodiment, it does not need to be limited to this. The game image can be displayed also on a stationary monitor (e.g., television monitor) by connecting the main body apparatus 2 to the stationary monitor via a cradle. In such a case, it is possible to constitute a game system including the game system 1 and the stationary monitor.

Furthermore, although the above-described embodiment are described on a case where the game system 1 having structure that the left controller 3 and the right controller 4 are attachable to or detachable from the main body apparatus 2 is used, it does not need to be limited to this. For example, it is possible to use a game apparatus including the main body apparatus 2 integrally provided with an operation portion having operation buttons and analog sticks similar to those of the left controller 3 and the right controller 4, or a game apparatus such as further electronic equipment capable of executing a game program. The further electronic equipment corresponds to smartphones, tablet PCs or the like. In such a case, an operation portion may constitute with software keys.

Furthermore, specific numeral values and images shown in the above-described embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium having stored with a game program executable by one or more processors of an information processing apparatus, wherein the game program causes the one or more processors to execute;

executing a game played by a player in any one game mode out of a normal mode, a menu mode and an image capture mode; and generating an image of a virtual space based on a virtual camera; and in the normal mode, moving a player character in the virtual space based on a moving operation input in the normal mode;

controlling the virtual camera in the virtual space based on a first virtual camera operation input;

changing from the normal mode to the menu mode based on a first operation input; and changing from the normal mode to the image capture mode based on a second operation input; and in the menu mode, arranging, when changed to the menu mode based on the first operation input, the virtual camera in a predetermined position based on a position of the player character regardless of an arrangement of the virtual camera immediately before changing to the menu mode;

generating a menu image that includes a plurality of selectable menu items, the menu image is superposed on the virtual space such that the virtual space is viewable through the menu image; and changing from the menu mode to the image capture mode based on a third operation input; and in the image capture mode, arranging, when changed to the image capture mode from the normal mode and the menu mode, the virtual camera at a start time of the image capture mode in a position based on an arrangement of the virtual camera immediately before changing to the image capture mode;

controlling a position and a direction of the virtual camera based on a second virtual camera operation input; and storing an image based on the virtual camera according to an image capture instruction input in a memory.

2. The storage medium according to the claim 1, wherein the game program causes the one or more processors to execute: generating the menu image including an image capture mode changing menu item for changing to the image capture mode based on the third operation input.

3. The storage medium according to the claim 1, wherein the game program causes the one or more processors to execute: generating an image of the virtual space based on the virtual camera; and generating the menu image including a plurality of translucent menu items, where the virtual space is viewable through the plurality of translucent menu items.

4. The storage medium according to the claim 1, wherein the game program causes the one or more processors to execute: setting the position and the direction of the virtual camera so as to become a position and a direction capable of showing the player character from a back side of the player character.

5. The storage medium according to the claim 1, wherein the game program causes the one or more processors to execute: generating in the normal mode and the menu mode, based on the virtual camera, an image of the virtual space including the player character; and generating in the image capture mode, based on the virtual camera, an image not including the player character.

6. The storage medium according to the claim 1, wherein the game program causes the one or more processors to execute: controlling a position and a direction of the player character based on the second virtual camera operation input.

7. The storage medium according to the claim 1, wherein the game program causes the one or more processors to execute: changing from the image capture mode to a mode before changing to the image capture mode based on a fourth operation input, and setting the direction of the virtual camera to a direction of the virtual camera immediately before changing to the image capture mode when changed from the image capture mode to the normal mode or the menu mode based on the fourth operation input.

8. The storage medium according to the claim 1, wherein the game program causes the one or more processors to execute: changing from the menu mode to the normal mode based on a fourth operation input after changing to the menu mode based on the first operation input; and setting the direction of the virtual camera to a direction of the virtual camera in the normal mode immediately before changing to the menu mode when changed from the menu mode to the normal mode based on the fourth operation input.

9. The storage medium according to the claim 1, wherein the game program causes the one or more processors to execute: storing a predetermined part of a generated image of the virtual space in the memory as the image based on the virtual camera.

10. The storage medium according to the claim 1, wherein the game program causes the one or more processors to execute: moving, when changed to the image capture mode, the position of the virtual camera by a predetermined distance in a predetermined direction based on the direction of the virtual camera immediately before changing to the image capture mode.

11. A game system comprising one or more processors configured to execute game processing, wherein in the game processing, the one or more processors is configured to execute a game played by a player in any one game mode out of a normal mode, a menu mode and an image capture mode and generate an image of a virtual space based on a virtual camera, and in the normal mode, the one or more processors is configured to:

move a player character in the virtual space based on a moving operation input;

control the virtual camera in the virtual space based on a first virtual camera operation input;

change from the normal mode to the menu mode based on a first operation input; and change from the normal mode to the image capture mode based on a second operation input, and in the menu mode, the one or more processors is configured to:

arrange, when changing to the menu mode, the virtual camera at a predetermined position that is based on a position of a player character regardless of an arrangement of the virtual camera immediately before changing to the menu mode;

generate a menu image including a plurality of selectable menu items, the menu image is superposed on the virtual space such that the virtual space is viewable through the menu image; and change from the menu mode to the image capture mode based on a third operation input, and in the image capture mode, the one or more processors is configured to:

arrange, when changing to the image capture mode from the normal mode and the menu mode, the virtual camera, at a start of the image capture mode, at a position that is based on an arrangement of the virtual camera immediately before changing to the image capture mode;

control a position and a direction of the virtual camera based on a second virtual camera operation input; and store an image that is based on the virtual camera in a memory based on an image capture instruction in a memory.

12. The game system according to the claim 11, wherein the one or more processors is configured to: generate the menu image including an image capture mode changing menu item for changing to the image capture mode based on the third operation input.

13. The game system according to the claim 11, wherein the one or more processors is configured to: generate an image of the virtual space based on the virtual camera; and generate the menu image including a plurality of translucent menu items, where the virtual space is viewable through the plurality of translucent menu items.

14. The game system according to the claim 11, wherein the one or more processors is configured to: set the position and the direction of the virtual camera so as to become a position and a direction capable of showing the player character from a back side of the player character.

15. The game system according to the claim 11, wherein the one or more processors is configured to: generate, in the normal mode and the menu mode, based on the virtual camera, an image of the virtual space including the player character; and generate in the image capture mode, based on the virtual camera, an image not including the player character.

16. The game system according to the claim 11, wherein the one or more processors is configured to: control a position and a direction of the player character based on the second virtual camera operation input.

17. The game system according to the claim 11, wherein the one or more processors is configured to: change from the image capture mode to a mode immediately before changing to the image capture mode based on a fourth operation input; and set the direction of the virtual camera to a direction of the virtual camera immediately before changing to the image capture mode when changed from the image capture mode to the normal mode or the menu mode based on the fourth operation input.

18. The game system according to the claim 11, wherein the one or more processors is configured to: change from the menu mode to the normal mode based on a fourth operation input after changing to the menu mode based on the first operation input; and set the direction of the virtual camera to a direction of the virtual camera in the normal mode immediately before changing to the menu mode when changed from the menu mode to the normal mode based on the fourth operation input.

19. The game system according to the claim 11, wherein the one or more processors is configured to store a predetermined part of a generated image of the virtual space in the memory as the image based on the virtual camera.

20. The game system according to the claim 11, wherein the one or more processors to configured to: move, when changed to the image capture mode, the position of the virtual camera by a predetermined distance in a predetermined direction based on the direction of the virtual camera immediately before changing to the image capture mode.

21. A game control method of a game apparatus, the game control method comprising:

executing a game played by a player in any one game mode out of a normal mode, a menu mode and an image capture mode; and generating an image of a virtual space based on a virtual camera, and in the normal mode, moving a player character in the virtual space based on a moving operation input;

controlling the virtual camera in the virtual space based on a first virtual camera operation input;

changing from the normal mode to the menu mode based on a first operation input; and changing from the normal mode to the image capture mode based on a second operation input, and in the menu mode:

arranging, when changing to the menu mode, the virtual camera at a predetermined position that is based on a position of a player character regardless of an arrangement of the virtual camera immediately before changing to the menu mode; and generating a menu image including a plurality of selectable menu items, the menu image is superposed on the virtual space such that the virtual space is viewable through the menu image; and changing from the menu mode to the image capture mode, and in the image capture mode, arranging, when changing to the image capture mode from the normal mode and the menu mode, the virtual camera at a start of the image capture mode at a position that is based on an arrangement of the virtual camera immediately before changing to the image capture mode;

controlling a position and a direction of the virtual camera based on a second virtual camera operation input; and storing an image that is based on the virtual camera in a memory based on a shooting instruction in a memory.

* * * * *